(12) United States Patent
Ikeda et al.

(10) Patent No.: US 7,139,061 B2
(45) Date of Patent: Nov. 21, 2006

(54) LIQUID CRYSTAL DISPLAY DEVICE AND METHOD OF MANUFACTURING THE SAME

(75) Inventors: Masahiro Ikeda, Kanagawa (JP); Manabu Sawasaki, Kanagawa (JP); Yoji Taniguchi, Kanagawa (JP); Hiroyasu Inoue, Kanagawa (JP); Tomonori Tanose, Tottori (JP); Yoshinori Tanaka, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 69 days.

(21) Appl. No.: 10/702,374

(22) Filed: Nov. 6, 2003

(65) Prior Publication Data
US 2004/0090582 A1 May 13, 2004

Related U.S. Application Data

(62) Division of application No. 09/501,747, filed on Feb. 10, 2000, now Pat. No. 6,671,025.

(30) Foreign Application Priority Data

Feb. 15, 1999 (JP) ............... 11-036477
Sep. 10, 1999 (JP) ............... 11-257156

(51) Int. Cl.
G02F 1/1333 (2006.01)
G02F 1/1335 (2006.01)
G02F 1/1337 (2006.01)
G02F 1/1339 (2006.01)

(52) U.S. Cl. ............... 349/156; 349/106; 349/130; 349/88

(58) Field of Classification Search ............... 349/156, 349/106, 88, 130
See application file for complete search history.

(56) References Cited

U.S. PATENT DOCUMENTS

| 5,583,675 | A | * | 12/1996 | Yamada et al. ........... 349/84 |
| 5,815,232 | A | | 9/1998 | Miyazaki et al. ........ 349/155 |
| 5,822,027 | A | | 10/1998 | Shimada et al. |
| 5,917,572 | A | | 6/1999 | Kurauchi et al. |
| 6,025,899 | A | | 2/2000 | Fukunaga et al. |

(Continued)

FOREIGN PATENT DOCUMENTS

EP     0 854 377 A2     7/1998

(Continued)

OTHER PUBLICATIONS

Anonymous: "Liquid Crystal Display" Research Disclosure, Kenneth Mason Publications, Hampshire, GB, vol. 41, May 1998 (May 1998), p. 647, 1Figure, XP002099562 ISSN: 0374-4353 Figure 2.

*Primary Examiner*—Huyen Ngo
(74) *Attorney, Agent, or Firm*—Greer, Burns & Crain, Ltd.

(57) ABSTRACT

In a liquid crystal display device, the pixel electrodes and the projection pattern are formed on the TFT substrate side, and surfaces of the pixel electrodes and the projection pattern are covered with a vertical alignment film. Opposing electrode and a projection pattern are formed on the CF substrate side, and surfaces of the opposing electrode and the projection pattern are covered with a vertical alignment film. The TFT substrate and the CF substrate are arranged such that top end portions of the projection pattern on the CF substrate are brought into contact with the TFT substrate. Liquid crystal having negative dielectric anisotropy is sealed between the TFT and CF substrates. Accordingly, the step of scattering the spacers can be omitted, change in the cell thickness can be prevented, and the good display quality can be achieved.

4 Claims, 42 Drawing Sheets

U.S. PATENT DOCUMENTS

| | | | | |
|---|---|---|---|---|
| 6,067,141 A | * | 5/2000 | Yamada et al. | 349/129 |
| 6,582,862 B1 | * | 6/2003 | Nakamura et al. | 430/7 |
| 6,671,025 B1 | * | 12/2003 | Ikeda et al. | 349/156 |
| 2002/0075429 A1 | * | 6/2002 | Fujioka et al. | 349/106 |

FOREIGN PATENT DOCUMENTS

| | | |
|---|---|---|
| EP | 0 884 626 A2 | 12/1998 |
| GB | 2 321 718 A | 8/1998 |
| JP | 07-199193 | 8/1995 |
| JP | 7-311383 | 11/1995 |
| JP | 8-248411 | 9/1996 |
| JP | 10-039318 | 2/1998 |
| JP | 10-048640 | 2/1998 |
| JP | 10-153797 | 6/1998 |
| JP | 10-186331 | 7/1998 |
| JP | 10-197877 | 7/1998 |

* cited by examiner

FIG. 2A
FIG. 2B
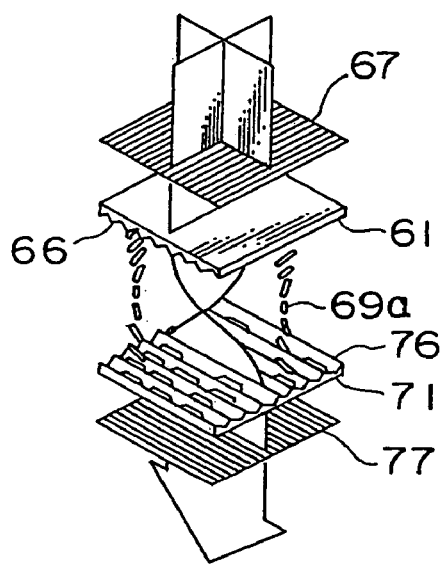
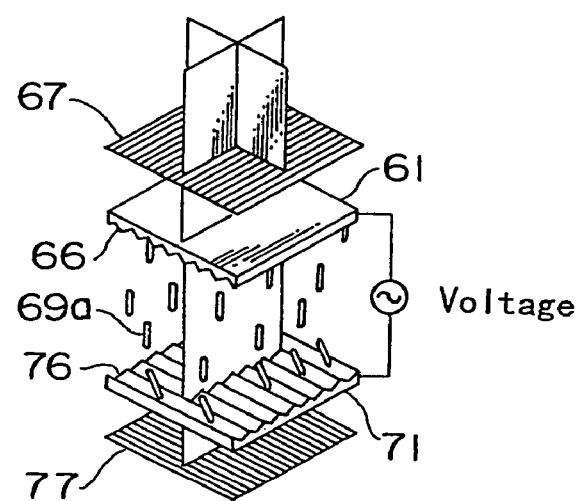

Pixel Region and Level Difference of the Black Matrix

LIQUID CRYSTAL DISPLAY DEVICE AND METHOD OF MANUFACTURING THE SAME

This is a division of Ser. No. 09/501,747 filed on Feb. 10, 2000 now U.S. Pat. No. 6,671,025.

BACKGROUND OF THE INVENTION

1. Field of the Invention

The present invention relates to a vertically aligned liquid crystal display device and a method of manufacturing the same and, more particularly, a liquid crystal display device having a structure in which the alignment direction of liquid crystal molecules is split into plural directions in a pixel and a method of manufacturing the same.

2. Description of the Prior Art

The active matrix type liquid crystal display device can prevent the crosstalk by providing a switch, which is turned off at the time of non-selection to cut off the signal, to each pixel, and thus exhibits the excellent display characteristic rather than the simple matrix type liquid crystal display device. In particular, since the TFT (Thin Film Transistor) has the high driving capability in the liquid crystal display device which employs the TFTs as switches, such liquid crystal display device can exhibit the excellent display characteristic which is almost equivalent to the CRT (Cathode-Ray Tube).

FIG. 1 is a sectional view showing a structure of the normal TN (twisted nematic) liquid crystal display device.

The TN liquid crystal display device has a structure in which a liquid crystal 69 with positive dielectric anisotropy is sealed between two sheets of glass substrates 61, 71 which are arranged to oppose to each other. The TFTs (not shown), pixel electrodes 62, bus lines 63, a flatting layer 64, and an alignment film 66 are formed on an upper surface side of the glass substrate 61. The pixel electrodes 62 are formed of ITO (Indium-tin Oxide) as transparent conductive material. A voltage is supplied to these pixel electrodes 62 at a predetermined timing via the bus lines 63 and the TFTs to correspond to the image. The flatting layer 64 is formed of insulating material to cover the pixel electrodes 62 and the bus lines 63. A horizontal alignment film 66 formed of polyimide, etc. is formed on the flatting layer 64. An alignment process is applied to a surface of the alignment film 66 to decide the alignment direction of liquid crystal molecules when no voltage is applied. As the representative process of such alignment process, the rubbing process in which the surface of the alignment film is rubbed by a cloth roller along one direction is known.

While, a black matrix 72, color filters 73, a flatting layer 74, an opposing electrode 75, and an alignment film 76 are formed on a lower surface side of the glass substrate 71. The black matrix 72 is formed of metal such as Cr (chromium) such that the light does not transmit into areas between the pixels. The color filters 73 consist of three color filters of red (R), green (G), and blue (B). Any one of R•G•B color filters 73 opposes to one pixel electrode 62. The flatting layer 74 is formed to cover the black matrix 72 and the color filters 73. The opposing electrode 75 formed of ITO is formed under the flatting layer 74. The horizontal alignment film 76 is formed under the opposing electrode 75. A surface of the alignment film 76 is also subjected to the rubbing process. In this case, the rubbing direction of the alignment film 66 is different by 90° from the rubbing direction of the alignment film 76.

The glass substrates 61, 71 are arranged to put spherical or cylindrical spacers 79 between them. A layer thickness of the liquid crystal 69 (referred to as a "cell thickness" hereinafter) is kept constant by the spacers 79. The spacers 79 are formed of plastics or glass, for example.

In addition, polarizing plates (not shown) are stuck onto the lower surface side of the glass substrate 61 and the upper surface side of the glass substrate 71. In the normally white mode liquid crystal display device, two sheets of polarizing plates are arranged such that their polarization axes intersect orthogonally with each other. In the normally black mode liquid crystal display device, two sheets of polarizing plates are arranged such that their polarization axes are positioned in parallel with each other.

In this disclosure, the substrate on which the TFTs, the pixel electrodes, the alignment film, etc. are formed is referred to as a "TFT substrate", and the substrate on which the color filters, the opposing electrode, the alignment film, etc. are formed is referred to as a "CF substrate".

FIGS. 2A and 2B are schematic views showing an operation of the normally white mode TN liquid crystal display device. As shown in FIGS. 2A and 2B, in the normally white mode liquid crystal display device, two sheets of polarizing plates 67, 77 are arranged such that their polarization axes intersect orthogonally with each other. Since the liquid crystal 69 with the positive dielectric anisotropy and the horizontal alignment films 66, 76 are employed in the TN liquid crystal display device, the liquid crystal molecules 69a in the neighborhood of the alignment films 66, 76 are aligned in the rubbing direction of the alignment films 66, 76. As shown in FIG. 2A, in the TN liquid crystal display device in which two sheets of polarizing plates 67, 77 are arranged such that their polarization axes intersect orthogonally with each other, the liquid crystal molecules 69a sealed between two alignment films 66, 76 change their alignment direction helically as their positions come close from one substrate 61 side to the other substrate 71 side. At this time, the light which passes through the polarizing plate 67 enters into the layer of the liquid crystal 69 as the linearly polarized light. Since the liquid crystal molecules 69a are aligned to be gradually twisted, the polarization direction of the input light is also twisted gradually and thus the light can pass through the polarizing plate 77.

If the voltage applied between the pixel electrode 62 and the opposing electrode 75 is gradually increased, the liquid crystal molecules 69a start to rise along the direction of the electric field when the voltage exceeds a certain voltage (threshold value). When the sufficient voltage is applied, the liquid crystal molecules 69a are directed substantially vertically to the substrates 61, 71, as shown in FIG. 2B. At this time, the light which passes through the polarizing plate 67 fails to pass through the polarizing plate 77 since its polarization axis is not rotated by the layer of the liquid crystal 69.

In other words, in the TN liquid crystal display device, the direction of the liquid crystal molecules is changed from the almost parallel state to the substrates 61, 71 to the vertical state thereto in response to the applied voltage, and the transmittance of the light which is transmitted through the liquid crystal display device is also changed correspondingly. Thus, desired images can be displayed on the liquid crystal display device by controlling the transmittance of the light every pixel.

Meanwhile, the good viewing angle characteristic cannot be achieved by the TN liquid crystal display device having the above structure. That is, the good display quality can be achieved if the image is viewed from the vertical direction to the substrates, nevertheless the contrast is extremely lowered if the image is viewed from the oblique direction and also the density is inverted.

As the method of improving the viewing angle characteristic of the TN liquid crystal display device, the alignment partition is known. This can be attained by providing more than two areas which have different alignment directions in one pixel. More particularly, one pixel region is divided into two areas or more, and then their alignment films are rubbed along different rubbing directions respectively. Accordingly, since the light which is leaked from one area can be cut off in the other area, reduction in the contrast in the half tone display can be improved.

In recent years, the vertically aligned liquid crystal display device is watched with interest as the liquid crystal display device which is superior in the viewing angle characteristic and the display quality to the TN liquid crystal display device. The liquid crystal (positive liquid crystal) having the positive dielectric anisotropy and the horizontal alignment film are employed in combination in the TN liquid crystal display device, whereas the liquid crystal (negative liquid crystal) having the negative dielectric anisotropy and the vertical alignment film are employed in combination in the vertically aligned liquid crystal display device. In the vertically aligned liquid crystal display device, the liquid crystal molecules are aligned in the almost vertical direction to the substrates under the condition the voltage is not applied between the pixel electrode and the opposing electrode, while the alignment direction of the liquid crystal molecules is inclined gradually horizontally relative to the substrates when the voltage is applied between the pixel electrode and the opposing electrode.

By the way, in the vertically aligned liquid crystal display device in the prior art, like the TN liquid crystal display device shown in FIG. 1, the cell thickness is kept at a constant thickness by the spacers. The spacers are formed of spherical or cylindrical plastics or glass, as described above, and scattered onto any one substrate when the TFT substrate and the CF substrate are stuck together.

Therefore, in the vertically aligned liquid crystal display device in the prior art, the step of scattering the spacers is needed and the manufacturing steps become complicated. Also, the cell thickness becomes uneven due to variation in the scattering density of the spacers, and thus the display quality is degraded. In addition, if the vibration or the impact is applied to the liquid crystal display device, the spacers are moved to cause variation in the cell thickness. Furthermore, if the strong pressure is applied to the glass substrate, the spacers are sunk into the color filters, so that the cell thickness is also changed.

SUMMARY OF THE INVENTION

Therefore, it is an object of the present invention to provide a liquid crystal display device which can achieve the good display quality by omitting the step of scattering spacers and thus avoiding the change in cell thickness, and a method of manufacturing the same.

A liquid crystal display device of the present invention is characterized by comprising: a first substrate having a first electrode formed on one surface side and a first vertical alignment film to cover the first electrode; a second substrate having a second electrode formed on a surface side opposing to one surface of the first substrate, a first projection pattern formed of insulating material on the second electrode, and a second vertical alignment film for covering the second electrode and the first projection pattern, whereby top end portions of the first projection pattern come into contact with the first substrate; and a liquid crystal sealed between the first substrate and the second substrate and having a negative dielectric anisotropy.

The vertically aligned liquid crystal display device has the good viewing angle characteristic rather than the TN liquid crystal display device, and such viewing angle characteristic can be improved much more by using the alignment partition. In the vertically aligned liquid crystal display device, such alignment partition can be attained by providing projection patterns over the electrode (at least one of the pixel electrode and the opposing electrode). More particularly, in the vertically aligned liquid crystal display device, since the liquid crystal molecules are aligned in the direction perpendicular to the surface of the vertical alignment film, the alignment direction of the liquid crystal molecules becomes different on one slant surfaces of the projection patterns and the other slant surfaces if the projection patterns are provided over the electrodes. As a result, the alignment partition can be attained.

According to the present invention, the alignment partition can be attained by providing the projection patterns formed of insulating material over the electrode, and also the cell thickness can be kept constant by protruding largely at least a part of the projection pattern from the one substrate side to the other substrate side so as to bring top end portions of the projection pattern into contact with the other substrate.

In this manner, according to the present invention, since the cell thickness can be maintained constant by the projection pattern used to attain the alignment partition, the step of scattering the spherical or cylindrical spacers can be omitted, and thus degradation of the display quality due to movement of the spacers and sinking of the spacers into the color filters can be prevented.

BRIEF DESCRIPTION OF THE DRAWINGS

FIGS. 2A and 2B are schematic views showing an operation of the normally white mode TN liquid crystal display device;

DESCRIPTION OF THE PREFERRED EMBODIMENTS

Embodiments of the present invention will be explained with reference to the accompanying drawings hereinafter.

(First Embodiment)

Figure 3:
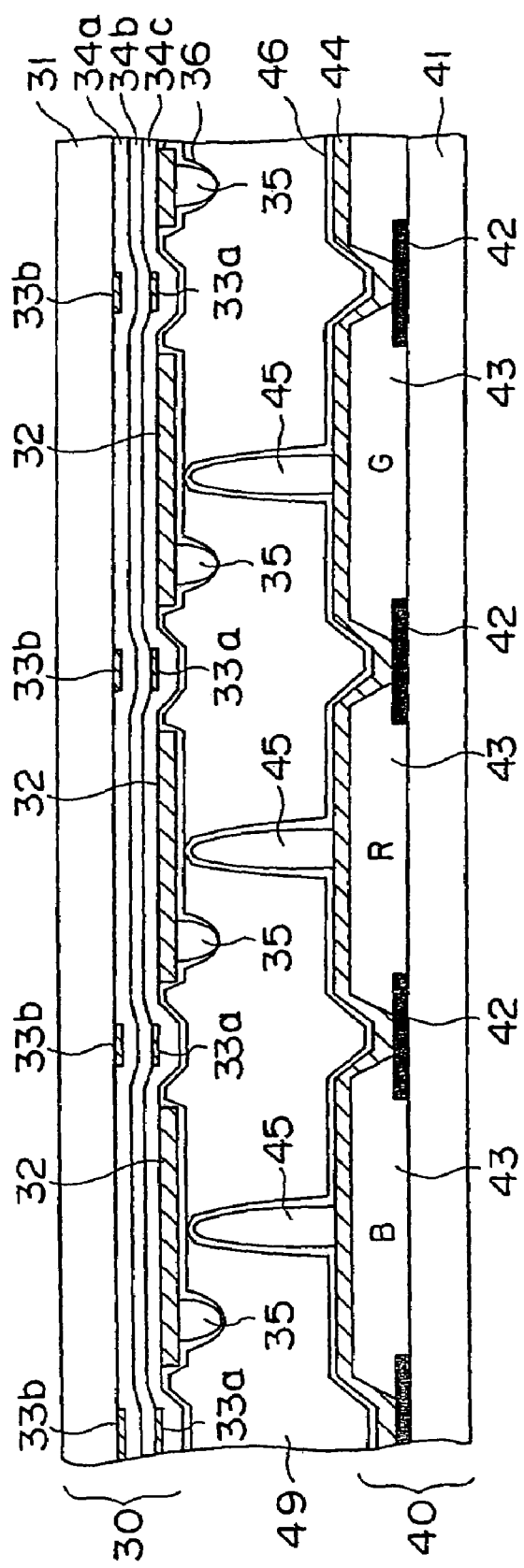
FIG. 3 is a sectional view showing a liquid crystal display device according to a first embodiment of the present invention.
Figure 4:
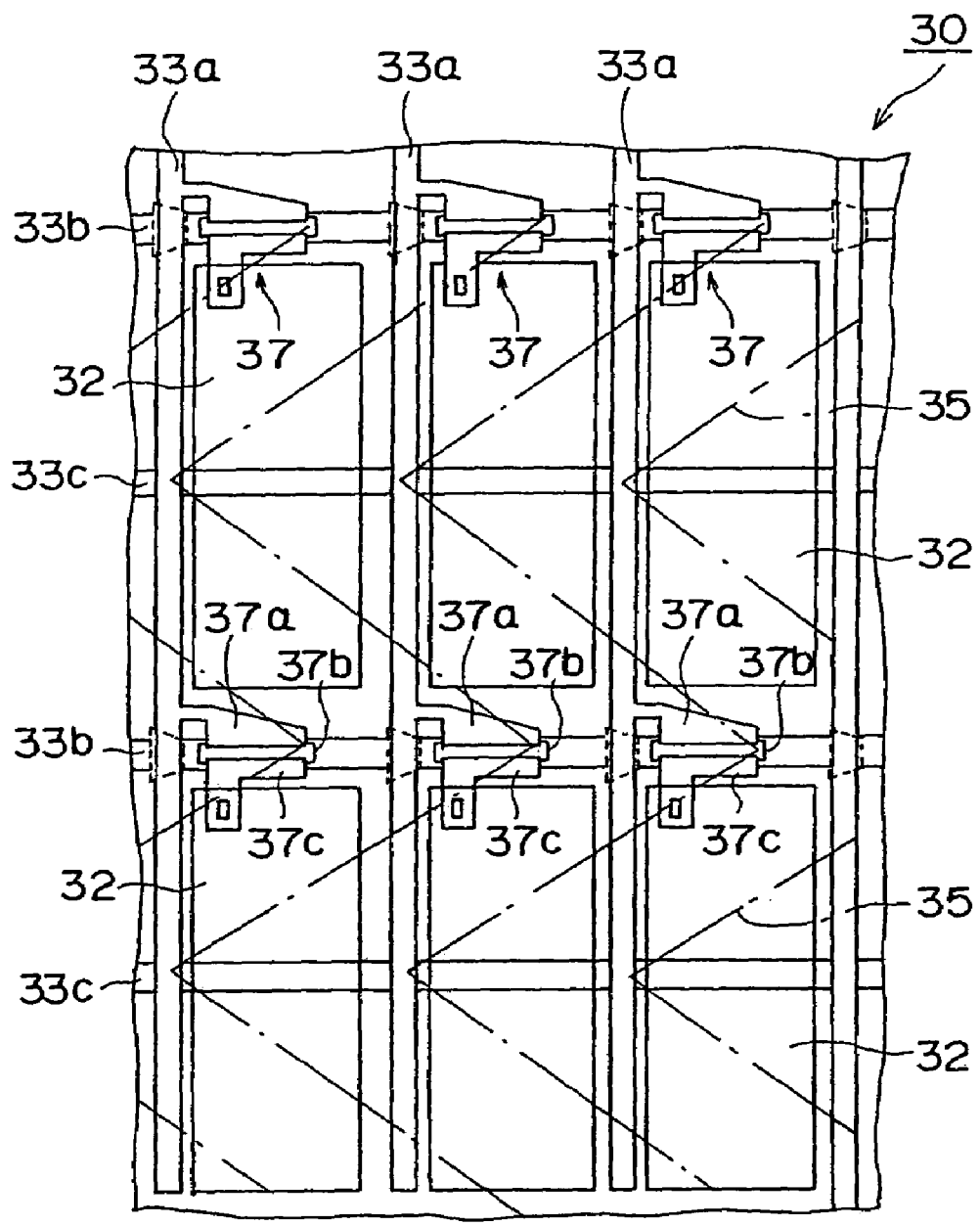
FIG. 4 is a plan view showing a TFT substrate of the liquid crystal display device according to the first embodiment.
Figure 5:
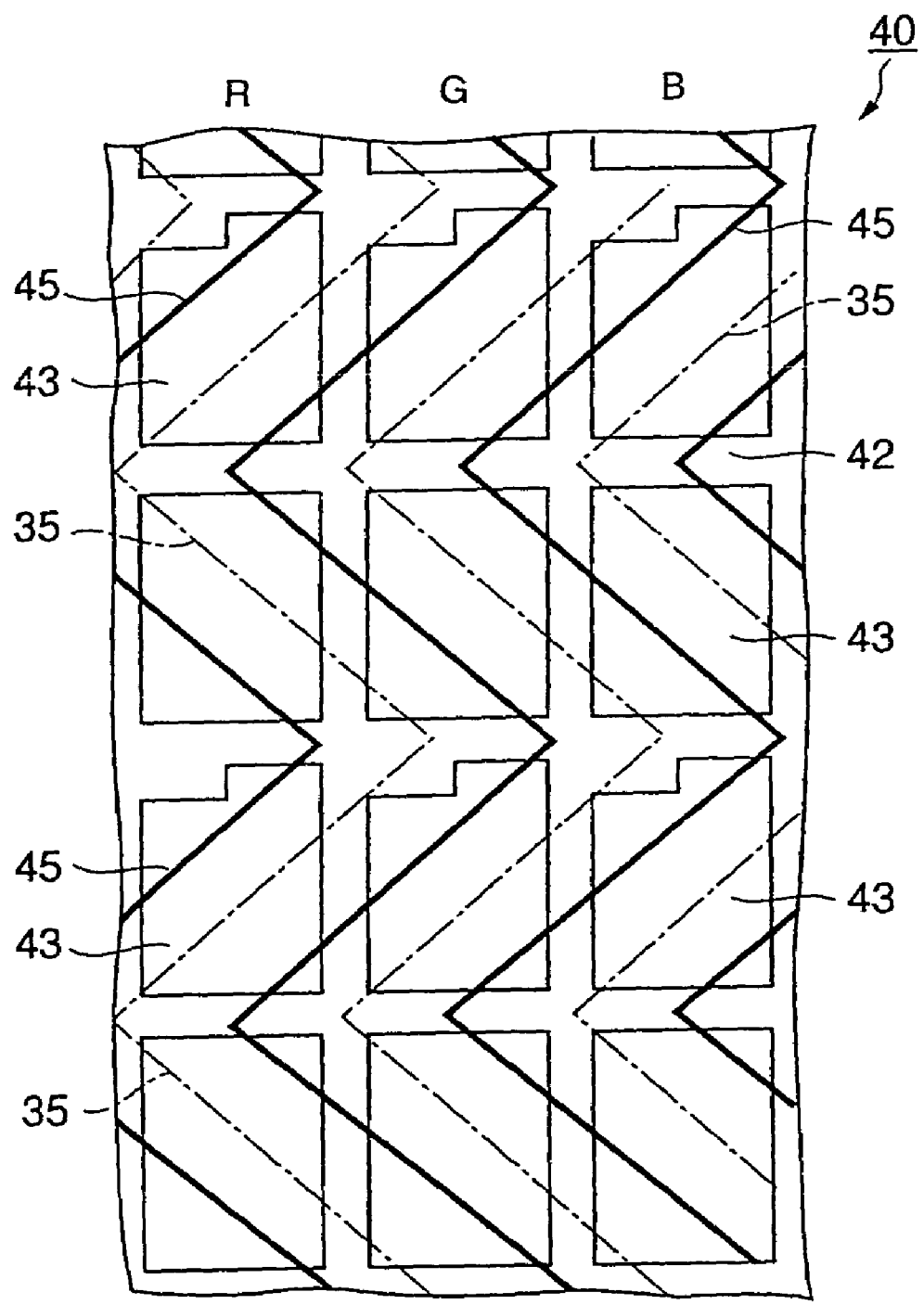
FIG. 5 is a plan view showing a CF substrate of the liquid crystal display device according to the first embodiment.

FIG. 3 is a sectional view showing a liquid crystal display device according to a first embodiment of the present invention. FIG. 4 is a plan view showing a TFT substrate 30 of the liquid crystal display device according to the first embodiment. FIG. 5 is a plan view showing a CF substrate 40 of the liquid crystal display device according to the first embodiment. In FIG. 5, projection patterns formed on the TFT substrate side are indicated by a dot-dash line.

The liquid crystal display device according to the first embodiment has a structure in which the liquid crystal 49 having the negative dielectric anisotropy is sealed between the TFT substrate 30 and the CF substrate 40. The polarizing plates (not shown) are arranged on the upper side of the TFT substrate 30 and the lower side of the CF substrate 40 respectively. These polarizing plates are arranged such that their polarization axes intersect with each other.

The TFT substrate 30 consists of a glass substrate 31, pixel electrodes 32 formed on the lower surface side of the glass substrate 31, insulating films 34a to 34c, an alignment film 36, etc. More particularly, as shown in FIG. 4, a plurality of gate bus lines 33b are formed in parallel on the lower surface side of the glass substrate 31. Also, auxiliary capacitance electrodes 33c are formed between the gate bus lines 33b respectively. The gate bus lines 33b and the auxiliary capacitance electrodes 33c are covered with an insulating film (gate insulating film) 34a formed on the lower surface side of the glass substrate 31 (see FIG. 3). A silicon film 37b serving as an active layer of the TFT 37 is selectively formed under the insulating film 34a. The silicon film 37b is formed of amorphous silicon or polysilicon. Rectangular areas which are partitioned by the gate bus lines 33b and drain bus lines 33a serve as pixel regions respectively.

The insulating film 34b is formed under the insulating films 34a and the silicon film 37a. A plurality of drain bus lines 33a, and drain electrodes 37a and source electrodes 37c of the TFTs 37 are formed under the insulating films 34b. The drain bus lines 33a are formed to intersect orthogonally with the gate bus lines 33b. The drain electrodes 37a are connected electrically to the drain bus lines 33a. The drain bus lines 33a, the drain electrodes 37a and the source electrodes 37c are covered with an insulating film (final protection film) 34c formed under the insulating films 34b. Then, the pixel electrodes 32 formed of ITO are formed under the insulating film 34c to be provided to the pixels on one-by-one basis. The pixel electrodes 32 are connected electrically to the source electrodes 37c via contact holes which are formed in the insulating film 34c.

The projection patterns 35 are formed below the pixel electrodes 32 in a zig-zag fashion, as indicated by a dot-dash line in FIG. 4. The projection pattern 35 is formed of insulating resin to have a height of about 1.5 μm. A vertical alignment film 36 is formed on an entire surface under the glass substrate 31, and surfaces of the pixel electrodes 32 and the projection patterns 35 are covered with the vertical alignment film 36. In FIG. 4, frustum portions, which are indicated by broken lines on intersecting portions between the data bus lines 33a and the gate bus lines 33b, indicate positions with which projection pattern 45 on the CF substrate 40, described later, comes into contact.

In the meanwhile, the CF substrate 40 consists of a glass substrate 41, a black matrix 42 formed on the upper surface side of the glass substrate 41, color filters 43, an opposing electrode 44, a vertical alignment film 46, etc. More particularly, as shown in FIG. 5, the black matrix 42 formed of a thin film of chromium (Cr) is formed on an upper surface of the glass substrate 41. The black matrix 42 is formed to cover the drain bus lines 33a, the gate bus lines 33b, the auxiliary capacitance electrodes 33c and the TFTs 37 on the TFT substrate 30.

Also, the color filters 43 of red (R), green (G), and blue (B) are formed on the glass substrate 41. These color filters 43 are positioned at positions which oppose to the pixel electrodes 32 of the TFT substrate 30 such that any one of red, green, and blue color filters 43 can correspond to one pixel electrode 32. Edge portions of the color filters 43 are overlapped with edge portions of the black matrix 42.

The opposing electrode 44 made of ITO is formed on the black matrix 42 and the color filters 43. The projection patterns 45 are formed on the opposing electrode 44 in a zig-zag fashion, as indicated by a thick line in FIG. 5. The projection pattern 45 is formed of insulating resin to have a height of about 4.0 μm. The vertical alignment film 46 is formed on the opposing electrode 44. Surfaces of the projection patterns 45 are covered with the vertical alignment film 46. As shown in FIG. 5, the projection patterns 45 formed on the CF substrate 40 side are positioned between the projection patterns 35 formed on the TFT substrate 30 side respectively.

In the first embodiment, each of the projection patterns 35 formed on the TFT substrate 30 side has a height of about 1.5 μm, while each of the projection patterns 45 formed on the CF substrate 40 side has a height of about 4.0 μm. Then, as shown in FIG. 3, top end portions of the projection patterns 45 formed on the CF substrate 40 side come contact into the TFT substrate 30 to keep the cell thickness constant. Therefore, in the first embodiment, the spacers (spherical or cylindrical members) which are needed in the prior art can be omitted, and also short-circuit between the pixel electrodes 32 on the TFT substrate 30 side and the opposing electrode 44 on the CF substrate 40 side can be avoided without fail. Also, if the spherical or cylindrical spacers are employed like the liquid crystal display device in the prior art, the alignment of the liquid crystal molecules is disordered to cause the defective display since such liquid crystal molecules are aligned along the surfaces of the spacers in the neighborhood of the spacers. However, since the spherical or cylindrical spacers are not employed in the first embodiment, the good display quality can be achieved.

Figure 6A:
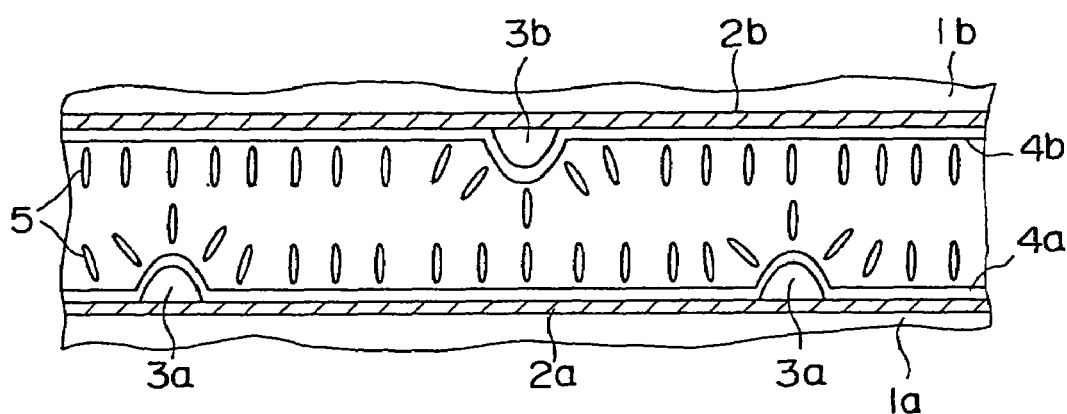
FIG. 6A is a view illustrating the principle upon which alignment partition can be achieved by projection patterns.

In addition, in the first embodiment, alignment partition can be achieved by the projection patterns 35 formed on the TFT substrate 30 side and the projection patterns 45 formed on the CF substrate 40 side. FIG. 6A is a schematic view illustrating the principle upon which the alignment partitions can be achieved by projection patterns.

In the liquid crystal display device shown in FIG. 6A, an electrode 2a is formed on one substrate 1a, and then projection patterns 3a formed of insulating material are formed on the electrode 2a. Surfaces of the electrode 2a and the projection patterns 3a are covered with a vertical alignment film 4a. An electrode 2b is formed under the other substrate 1b, and projection patterns 3b formed of insulating material are formed under the electrode 2b. Surfaces of the electrode 2b and the projection patterns 3b are covered with a vertical alignment film 4b.

Figure 6B:
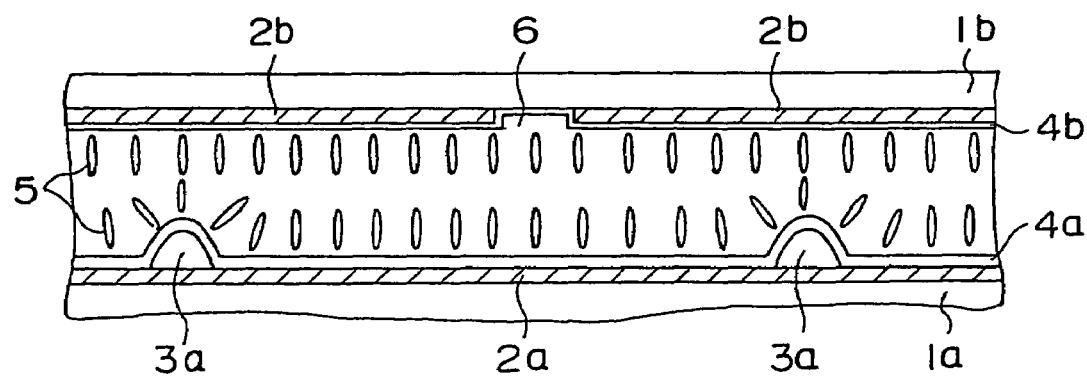
FIG. 6B is a view illustrating the principle upon which the alignment partition can be achieved by the projection patterns and slits of pixel electrodes.

Normally, in the vertically aligned liquid crystal display device, in order to make uniform the directions along which the liquid crystal molecules are inclined when the voltage is applied between the pixel electrodes and the opposing electrode, the rubbing process is applied to surfaces of the alignment films. However, as shown in FIG. 6B, if the projection patterns 3a are provided between the electrode 2a and the alignment film 4a and also the projection patterns 3b are provided between the electrode 2b and the alignment film 4b, the liquid crystal molecules located near the projection patterns 3a, 3b are aligned in the direction perpendicular to the surfaces of the projection patterns 3a, 3b. If the voltage is applied between the electrodes 2a, 2b under this condition, the inclination directions of the liquid crystal molecules 5 sealed between the electrodes 2a, 2b are determined by the influence of the liquid crystal molecules located near the projection patterns 3a, 3b. That is, the liquid crystal molecules 5 are inclined oppositely on both sides of the projection patterns 3a, 3b. As a result, the alignment partition can be achieved unless the rubbing process is applied to the alignment films 4a, 4b.

In place of provision of the projection patterns 3b onto the substrate 1b side, as shown in FIG. 6B, slits may be provided to the electrode 2b. In this case, when the voltage is applied between the electrodes 2a, 2b, the liquid crystal molecules are also inclined oppositely on both sides of the projection pattern 3a and the slits 6. As a result, the alignment partition can also be achieved.

In the first embodiment, as shown in FIG. 3, since the projection patterns 45, 35 are formed in a zig-zag fashion on the opposing electrode 44 and under the pixel electrodes 32 respectively, the alignment direction of the liquid crystal molecules can be partitioned into two directions or more in one pixel region. Accordingly, the good visual characteristics (including the contrast characteristic) can be achieved. In addition, in the first embodiment, the cell thickness can be held constant by the projection patterns 45 provided on the CF substrate 40 side. Since the projection patterns 45 are fixed onto the opposing electrode 44, the cell thickness is never changed due to the vibration and the impact. As a result, degradation of the display quality can be prevented.

In case a pattern width of the projection pattern (projection pattern 35 formed in the pixel regions) to attain the alignment partition is too narrow, a sufficient effect of the alignment partition cannot be achieved. Conversely, if the pattern width of the projection pattern 35 to attain the alignment partition is too wide, the bright image cannot be displayed since an aperture ratio is reduced. Therefore, it is preferable that the pattern width of the projection pattern 35 to attain the alignment partition should be set to 3 to 15 µm.

In addition, if a height of the projection pattern 35 to attain the alignment partition is too low, the sufficient effect of the alignment partition cannot be achieved. Therefore, the height of the projection pattern 35 to attain the alignment partition must be set more than ⅕ of the cell thickness in the opening portion of the light shielding film 42 (black matrix).

Figure 7:
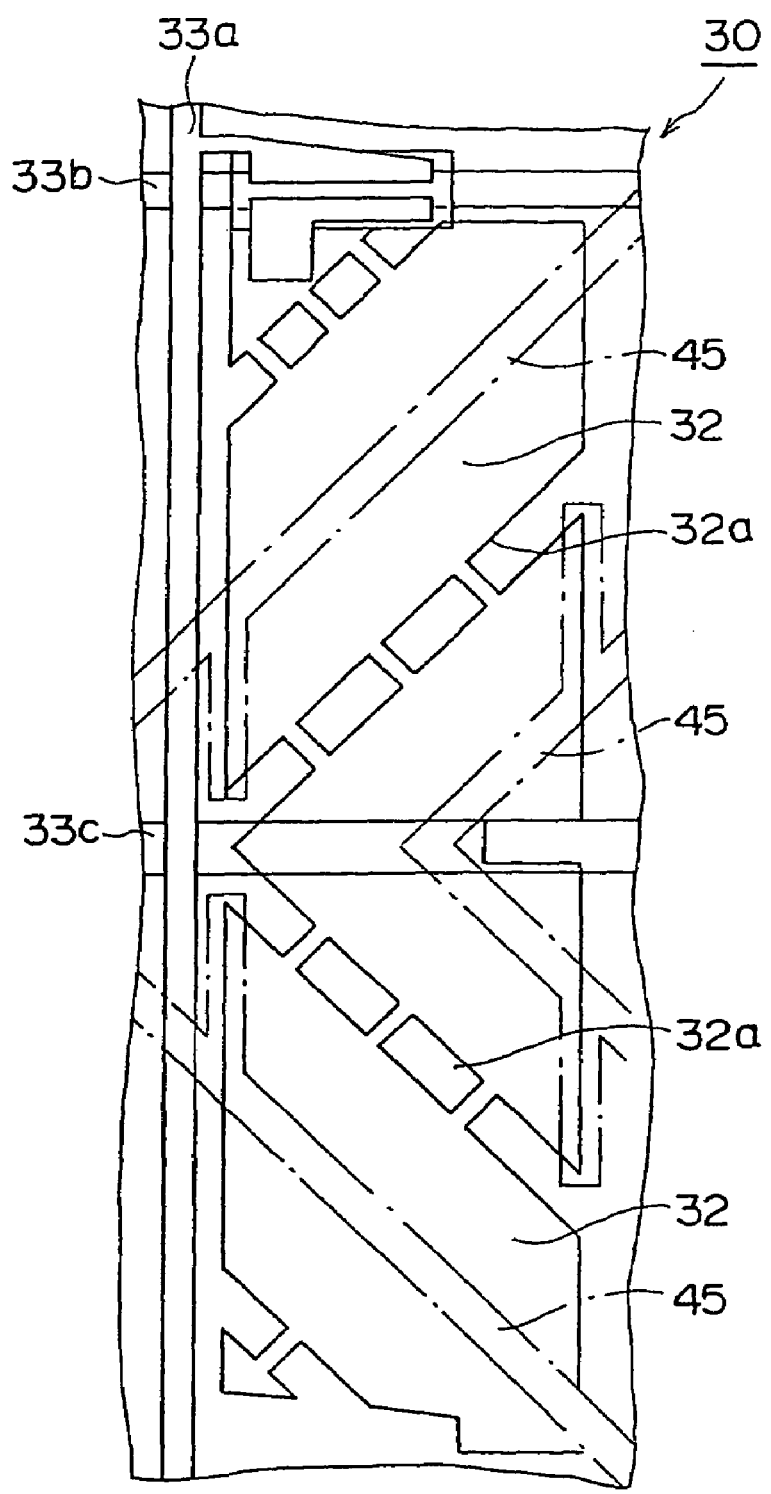
FIG. 7 is a view showing an example in which slits are formed in the pixel electrodes on the TFT substrate side.

In place of the projection pattern 35 to attain the alignment partition, as shown in FIG. 6B and FIG. 7, slits 6, 32a may be formed on the electrodes 2b, 32. Accordingly, since the direction of the electric field is slightly inclined relative to surfaces of the electrodes in the neighborhood of the slits 6, 32a when the voltage is applied to the electrodes 2b, 32, the alignment partition can be achieved like the case where the projection pattern is provided.

In Patent Application Publication (KOKAI) Hei 7-311383, there is disclosed the liquid crystal display device wherein the projection pattern formed of silicon nitride or silicon oxide is provided on the substrate and then the transparent electrode and the alignment film are formed thereon. However, the technology disclosed in Patent Application Publication (KOKAI) Hei 7-311383 is associated with the horizontally aligned liquid crystal display device, and therefore the operation and the advantages are different from those of the present invention. In other words, since the electrode is formed above projection pattern, the electrode has the slant surface to the substrate if the above technology is applied to the vertically aligned liquid crystal display device, the liquid crystal molecules are aligned perpendicularly to the slant surfaces when the voltage is not applied, while the liquid crystal molecules are going to be aligned in parallel with the slant surfaces when the voltage is applied. However, it cannot be defined to which side the liquid crystal molecules are rotated in the neighborhood of the slant surfaces when the voltage is applied, so that disturbance of the alignment is caused. In contrast, in the present invention, since the electrode is parallel with the substrate, the electric field is applied along the oblique direction to the liquid crystal molecules, which are aligned in the direction perpendicular to the slant surfaces of the projection pattern, when the voltage is applied. As a result, the rotating direction of the liquid crystal molecules can be defined to thus prevent disturbance of the alignment.

Next, a method of manufacturing the liquid crystal display device according to the first embodiment will be explained hereinbelow.

Figure 1:
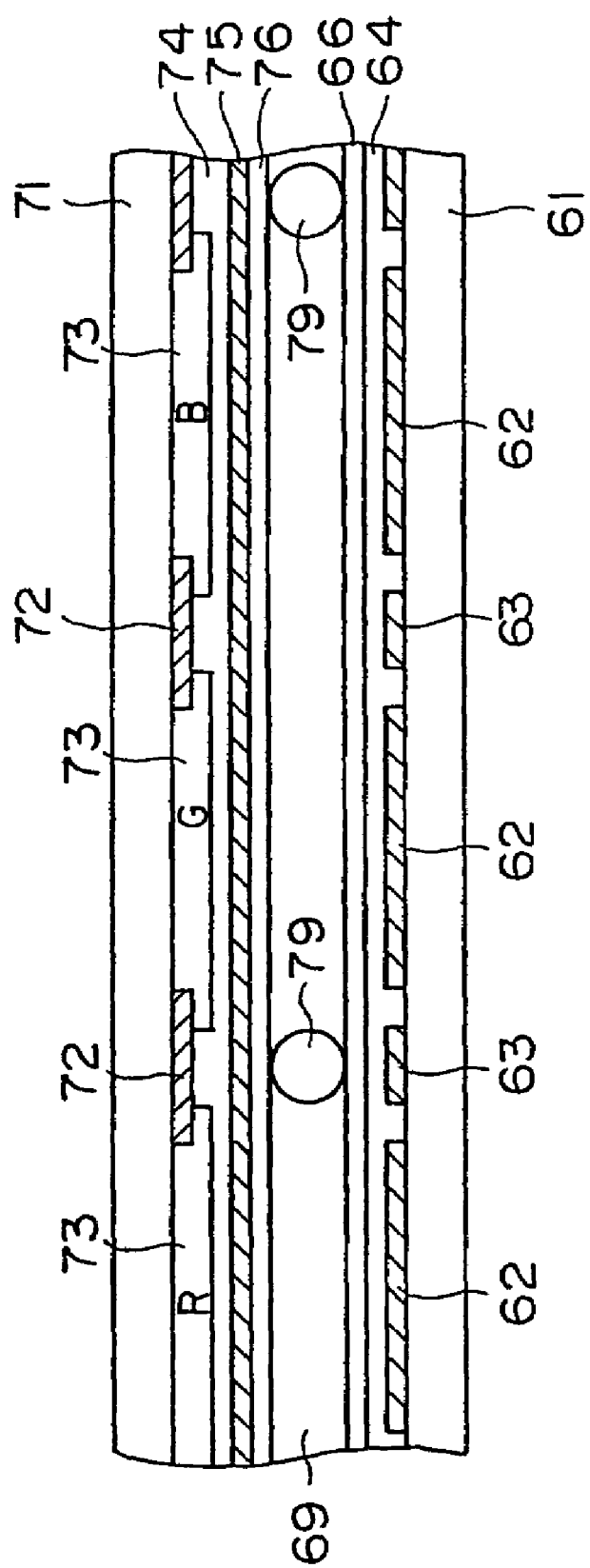
FIG. 1 is a sectional view showing a structure of a normal TN (twisted nematic) liquid crystal display device.

The TFT substrate 30 is formed as follows. First, according to the well known method, the drain bus lines 33a, the gate bus lines 33b, the auxiliary capacitance electrodes 33c, the TFTs 37, the pixel electrodes 32, and the insulating films 34a to 34c are formed on the glass substrate 31 (on the lower side in FIG. 1). In this case, thicknesses of the drain bus lines 33a, the gate bus lines 33b, and the auxiliary capacitance electrodes 33c are set to 0.15 µm, for example; a thickness of the insulating film 34a is set to about 0.35 µm, for example; a thickness of the silicon film 37b is set to 0.03 µm, for example; a thickness of the pixel electrode 32 is set to 0.07 µm, for example; and a thickness of the insulating film 34c is set to 0.33 µm, for example.

Then, photoresist of about 1.5 µm thickness is coated on the overall upper surface of the glass substrate 31, and then is exposed by using a mask having a predetermined pattern. Then, the projection patterns 35 each has a thickness of about 1.5 µm and a width of about 10 µm are formed in a zig-zag fashion by applying the developing process. In this case, as shown in FIG. 4, one pixel region may be partitioned into at least two areas by the projection patterns 35.

In turn, the vertical alignment film 36 formed of polyamic acid is formed on the glass substrate 31 at a predetermined pattern to have a thickness of about 0.1 µm. Thus, the TFT substrate 30 can be completed. In this case, in addition to the above polyamic acid film, a polyimide film and an inorganic film formed by the oblique evaporation, etc. may be employed as the vertical alignment film.

Then, the CF substrate 40 is formed as follows. First, a chromium (Cr) film of about 0.16 µm thickness is formed on the glass substrate 41, then photoresist having a predetermined pattern is formed on the chromium film, and then the black matrix 42 is formed by etching the chromium film while using the photoresist as a mask.

Then, the color filters 43 of red (R), green (G), and blue (B) are formed by coating blue resin, red resin, and green resin on the glass substrate 41 respectively. The thicknesses of the color filters 43 are set to about 1.5 µm, for example. Also, edge portions of the color filters 43 are set to overlap slightly with edge portions of the black matrix 42.

Then, the opposing electrode 44 of about 0.15 µm thickness is formed by sputtering ITO, for example, onto the overall upper surface of the substrate 41. Then, photoresist of about 4.0 µm thickness is coated on the opposing electrode 44. Then, as shown in FIG. 5, the projection patterns 45, each having a thickness of about 4.0 µm and a width of about 10 µm, are formed in a zig-zag fashion by exposing and developing the photoresist.

Next, the vertical alignment film 46 formed of the polyamic acid is formed over the glass substrate 41 to have a thickness of about 0.1 µm. Thus, the CF substrate 40 is completed.

After the TFT substrate 30 and the CF substrate 40 have been formed in this manner, they are arranged so as to oppose their surfaces on which the alignment films 36, 46 are formed respectively, and then the edge portions of the TFT substrate 30 and the edge portions of the CF substrate 40 are stuck together except a liquid crystal injection port. Then, the TFT substrate 30 and the CF substrate 40 being stuck together are cut into a desired size as the case may be.

Then, the liquid crystal 49 having the negative dielectric anisotropy is injected into the space between the TFT substrate 30 and the CF substrate 40, and then the liquid crystal injection port is tightly sealed. Then, the polarizing plates are stuck onto the outer surfaces of the TFT substrate 30 and the CF substrate 40 respectively. Accordingly, the liquid crystal display device according to the first embodiment is completed.

In the first embodiment, since the cell thickness is maintained constant by the projection patterns 45 provided on the CF substrate 40, the step of scattering the spherical or cylindrical spacers which are needed in the prior art is not required. In addition, since change in the cell thickness due to the movement of the spacers can be prevented, generation of the irregular display can be avoided. Furthermore, since the alignment partition can be achieved by the projection patterns 35, 45, there is no necessity to apply the rubbing process to the alignment films 36, 46 and thus both the rubbing step and the cleaning step performed after the rubbing step can be omitted. Furthermore, since the projection patterns 45 are fixed to the opposing electrode 44, displacement of the projection patterns 45 caused by the vibration and the impact does not occur and thus the change in the cell thickness can be prevented. Accordingly, reliability of the liquid crystal display device can be improved. Moreover, in the first embodiment, since the liquid crystal molecules are aligned so as to intersect orthogonally with the inclined surfaces of the projection patterns 35, 45, the alignment directions of the liquid crystal molecules become different on both sides of the projection patterns 35, 45, so that the alignment partition can be achieved. As a result, the good visual characteristics can be obtained.

Although the case where the projection patterns 35 are provided on the TFT substrate side is explained in the first embodiment, the slits may be provided in the pixel electrodes 32 (see FIG. 6B) in place of provision of the projection patterns 35. In this case, the alignment partition can also be achieved and therefore the similar advantages to the above first embodiment can be attained.

FIG. 7 is a view showing an example in which slits are formed in the pixel electrodes 32 on the TFT substrate 30 side. In this example, the slits 32a are provided in the pixel electrodes 32 in parallel with the projection patterns 45 formed on the CF substrate 40 side. According to such structure, when the voltage is applied, the direction of the electric field is inclined relative to the substrate in the neighborhood of the slits and thus the liquid crystal molecules are inclined in the direction toward the projection patterns. As a result, like the above first embodiment, the alignment partition can also be achieve.

In the present invention, if the width or the height of the projection pattern to achieve the alignment partition is too large, an open area ratio is reduced to then cause reduction in the transmittance of light. On the contrary, if the width or the height of the projection patterns is too small, the advantage of the alignment partition cannot be achieved, otherwise the pattern disconnection is ready to occur upon forming the projection patterns. As a result, it is preferable that the width and the height of the projection pattern to achieve the alignment partition should be appropriately set in accordance with the cell thickness.

The height and the width of the projection pattern to achieve the alignment partition (the projection pattern 35 in the first embodiment) will be explained hereunder.

Figures 8, 9:
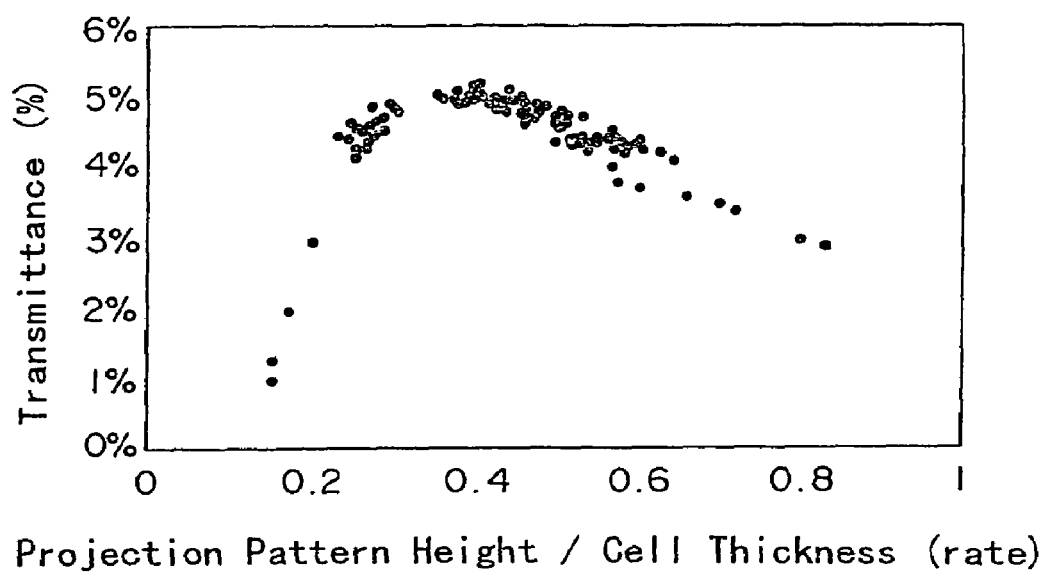
FIG. 8 is a graph showing a relation between a ratio of a height of the projection pattern and a cell thickness and a transmittance of a light on white display.
FIG. 9 is a graph showing a relation between a pattern width of the projection pattern and the transmittance of the light on white display.

FIG. 8 is a graph showing a relation between a ratio of a height of the projection pattern and a cell thickness and a transmittance of a light on white display, wherein an abscissa denotes the ratio of the height of the projection pattern and the cell thickness and an ordinate denotes the transmittance of the light on white display. As can be seen from FIG. 8, if the ratio of the height of the projection pattern and the cell thickness is set to more than 0.2, the transmittance of the light is in excess of about 3% and thus the bright image with the high contrast can be displayed. Therefore, it is preferable that the height of the projection pattern to achieve the alignment partition should be set more than twice the cell thickness. More preferably, the range of the height of the projection pattern should be set to 0.2 to 0.8 times the cell thickness, and still more preferably it should be set to 0.3 to 0.5 times the cell thickness.

FIG. 9 is a graph showing a relation between a pattern width of the projection pattern and the transmittance of the light on white display, wherein an abscissa denotes the pattern width of the projection pattern and an ordinate denotes the transmittance of the light on white display. As can be seen from FIG. 9, the transmittance exceeds about 3% by setting the pattern width of the projection pattern to 5 μm to 15 μm, and therefore the bright image with the high contrast can be displayed. Therefore, it is preferable that the pattern width of the projection pattern should be set to 5 μm to 15 μm.

(Second Embodiment)

Figure 10:
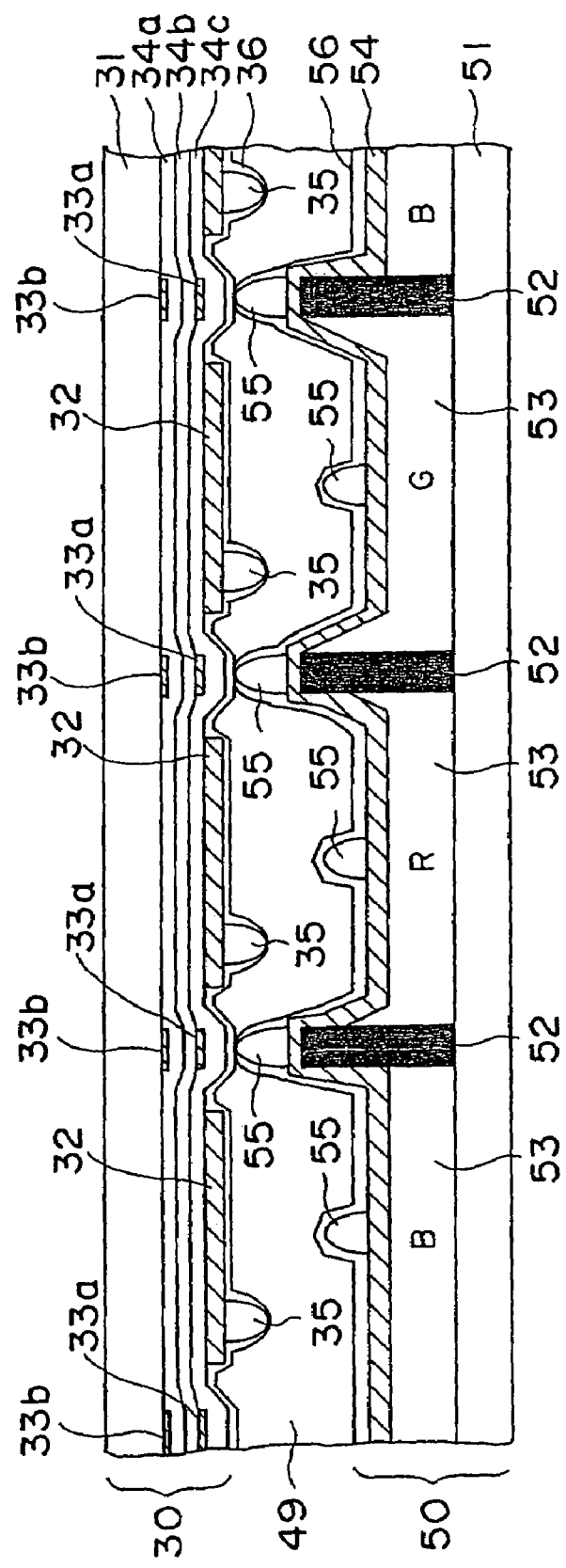
FIG. 10 is a sectional view showing a liquid crystal display device according to a second embodiment of the present invention.
Figure 11:
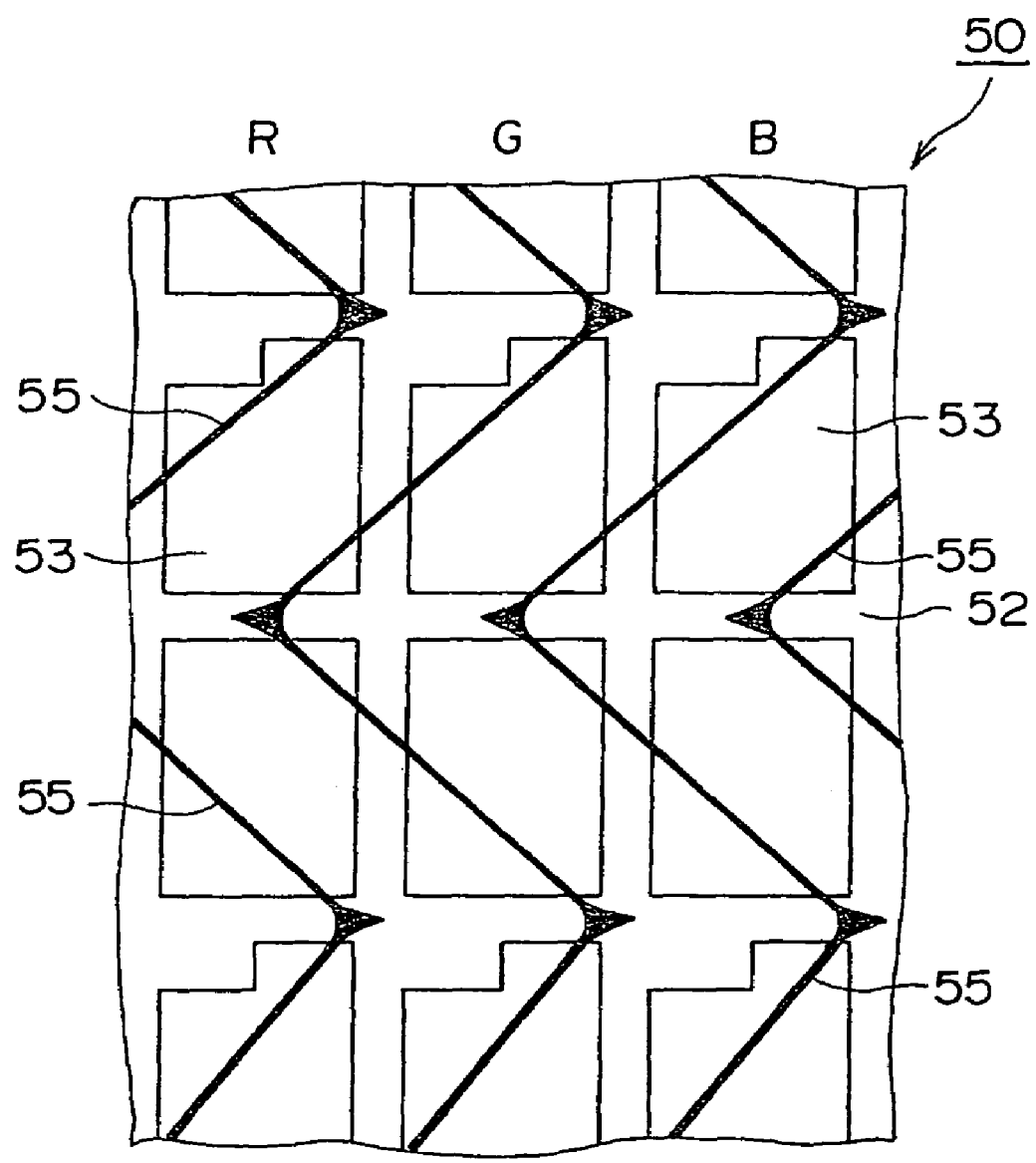
FIG. 11 is a plan view showing the CF substrate of the liquid crystal display device according to the second embodiment.

FIG. 10 is a sectional view showing a liquid crystal display device according to a second embodiment of the present invention. FIG. 11 is a plan view showing the CF substrate of the liquid crystal display device according to the second embodiment. Since a difference of the second embodiment from the first embodiment resides in that a different structure of the CF substrate is employed, same symbols are affixed to the same constituent elements in FIG. 10 as those in FIG. 3 and their detailed explanation will be omitted hereunder.

A black matrix 52 is formed on a glass substrate 51 on the CR substrate 50 side to coincide with the gate bus lines 33b, the drain bus lines 33a, TFTs and the auxiliary capacitance electrodes on the TFT substrate 30. This black matrix 52 is formed of black resin to have a thickness of about 4 μm. The red (R), green (G), and blue (B) color filters 53 are formed at opening portions of the black matrix 52. Each thickness of these color filters 53 is about 1.5 μm. Then, an opposing electrode 54 formed of ITO is formed on the black matrix 52 and the color filters 53. Then, as shown in FIG. 11, a projection pattern 55 of about 1.5 μm height is formed on the opposing electrode 54, in a zig-zag fashion. Then, a vertical alignment film 56 is formed on the opposing electrode 54, and a surface of the projection pattern 55 is covered with the alignment film 56. The projection pattern 55 on the CF substrate 50 side comes into contact with the TFT substrate 30 at portions (frustum portions indicated by a broken line in FIG. 4) where the data bus lines 33a intersect with the gate bus lines 33b.

According to the present invention, the light shielding film 52 is formed thick and then the first projection pattern 55 is formed thereon to come into contact with the other substrate. A reduction in the open area ratio can be prevented by arranging some portions of the projection pattern, which contact to the other substrate, on the light shielding film.

Figure 12:
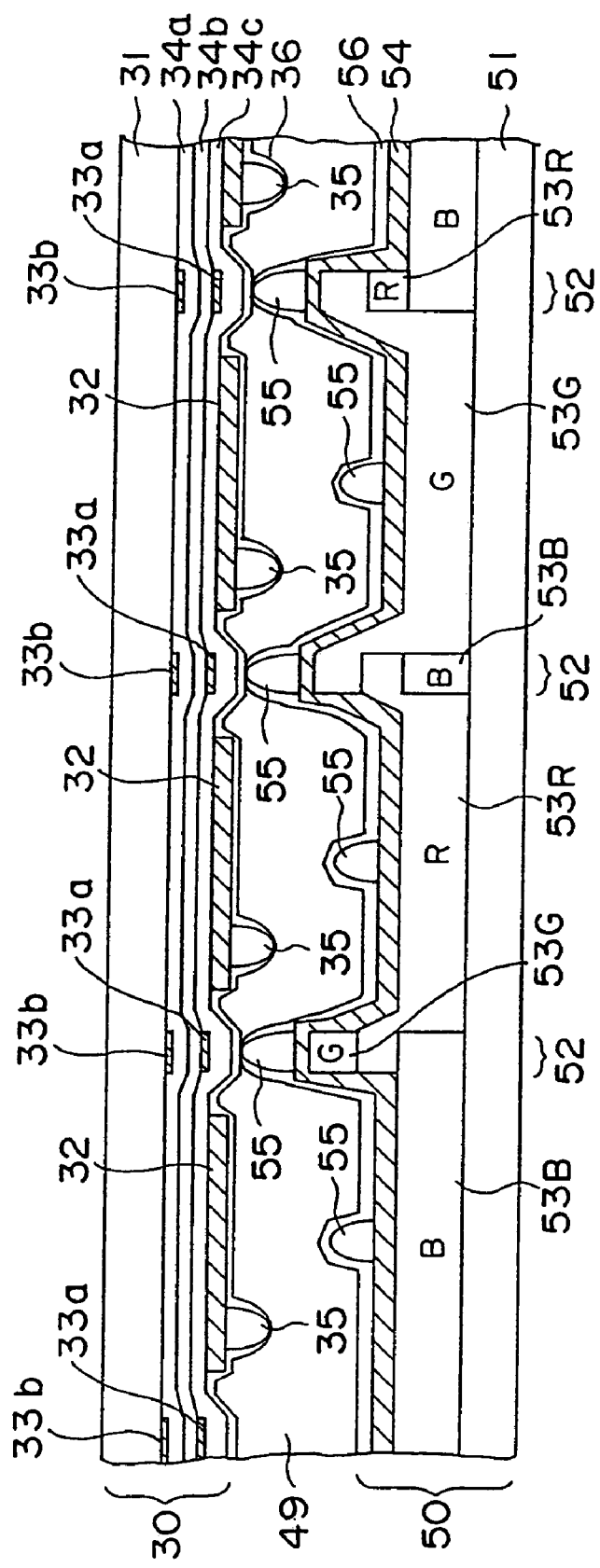
FIG. 12 is a sectional view showing a liquid crystal display device according to a third embodiment of the present invention.

Further, as shown in FIG. 12, the light shielding film 52 may be formed by overlapping more than two color filters of three color filters of red (R), green (G), and blue (B). In this case, manufacturing steps can be simplified rather than the method by which the light shielding film is formed by using metal such as chromium (Cr), etc.

A method of manufacturing a liquid crystal display device according to the second embodiment will be explained hereunder. In this case, the method of manufacturing the TFT substrate is similar to that in the first embodiment and therefore their explanation will be omitted.

First, the black matrix 52 of about 4.0 μm thickness is formed of black resin on the glass substrate 51. Although material of the black matrix 52 is not particularly limited, the acrylic resin into which carbon black is mixed, for example, may be employed. In this case, the black matrix 52 is formed by coating the carbon black-mixed acrylic resin on the glass substrate 51.

Then, the red (R), green (G), and blue (B) color filters 53 are formed in respective pixel regions by coating sequentially red resin, green resin, and blue resin onto the opening portions of the black matrix 52 on the glass substrate 51 to have a thickness of about 1.5 μm. Accordingly, difference in level of about 2.5 μm are formed between the black matrix 52 and the color filters 53.

Figure 13:
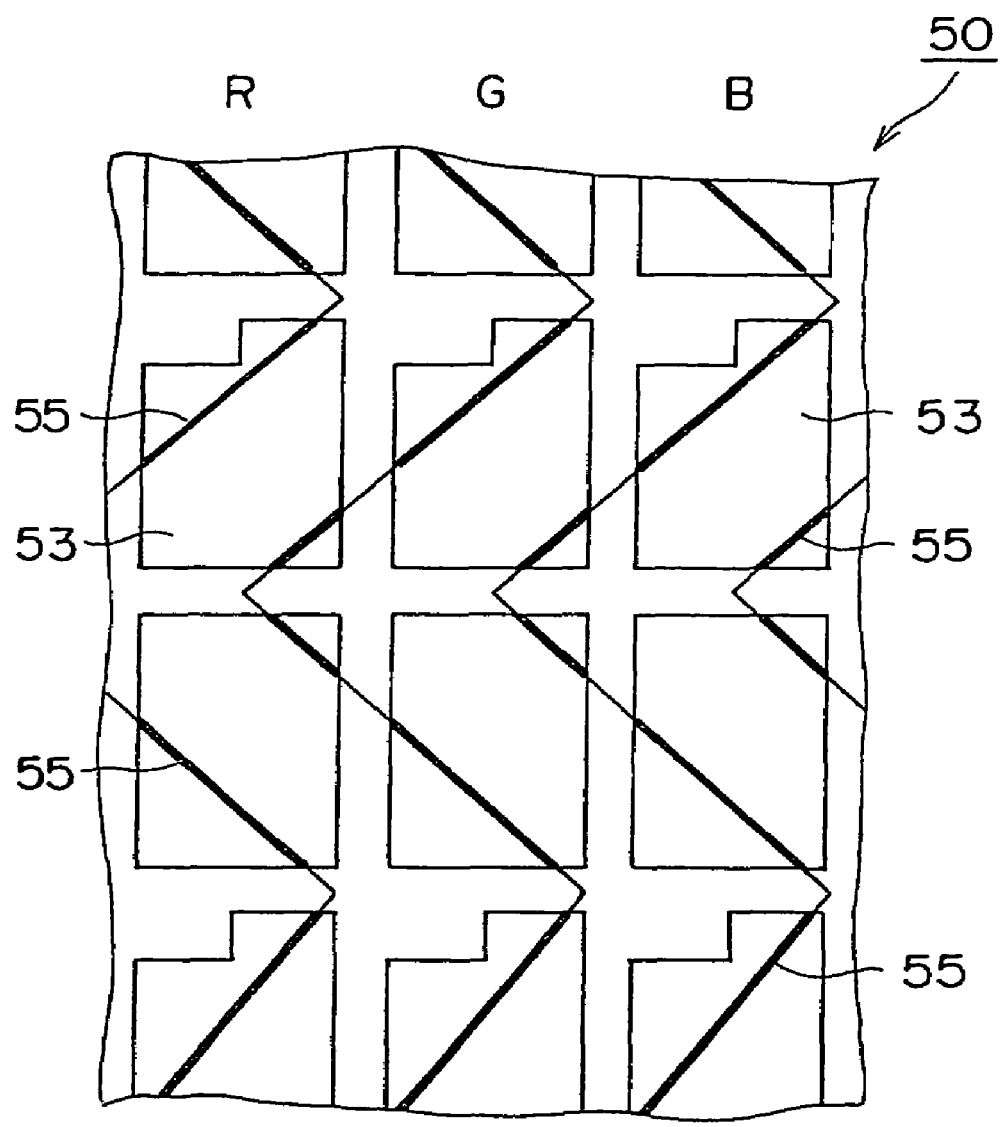
FIG. 13 is a plan view showing the CF substrate which indicates the problem caused when a width of a projection pattern on a black matrix is set identically to other portions.

Next, the opposing electrode 54 of about 0.15 μm thickness is formed by sputtering ITO on the entire upper surface of the glass substrate 51. Then, the projection pattern 55 is formed in a zig-zag fashion on the opposing electrode 54 to have a height of about 1.5 μm and a width of about 10 μm. Like the first embodiment, the projection pattern 55 is formed by using the photoresist. In this case, if the width of the projection pattern of the exposure mask is uniform, as shown in FIG. 13, the width of the projection pattern 55 on the black matrix 52 is narrowed rather than other portions after the exposure and development processes, so that there is such a possibility that the strength necessary for the spacers cannot be assured. Therefore, it is preferable that, as shown in FIG. 11, the width of the projection pattern 55 on the black matrix 52 should be formed wider than other portions.

Then, the vertical alignment film 56 formed of the polyamic acid is formed on the opposing electrode 54 to have a thickness of about 0.15 μm. The surfaces of the opposing electrode 54 and the projection pattern 55 are covered with the vertical alignment film 56. As a result, the CF substrate 50 is completed.

Then, as shown in FIG. 10, the TFT substrate 30 and the CF substrate 50 are superposed while directing their surfaces, on which the alignment films 36, 56 are formed respectively, toward the inside. In this case, the projection pattern 55 on the black matrix 52 comes into contact with the TFT substrate 30, so that a clearance (cell thickness) between the CF substrate 50 and the TFT substrate 30 can be kept constant (about 4 μm).

Then, edge portions of the CF substrate 50 and the TFT substrate 30 are jointed together and then the liquid crystal having the negative dielectric anisotropy is sealed into a clearance between them. Then, the polarizing plates (not shown) are arranged on the outsides of the CF substrate 50 and the TFT substrate 30 respectively. As a result, the liquid crystal display device according to the second embodiment is completed.

In the second embodiment, the alignment partition can be achieved by the projection patterns 35, 55 and thus the good visual characteristics can be obtained like the first embodiment. Also, since the cell thickness can be maintained constant by the projection pattern 55 on the black matrix 52 and such cell thickness is not changed even if the vibration or the impact is applied, degradation of the display quality can be avoided. In addition, the step of scattering the spherical or cylindrical spacers and the step of performing the rubbing process of the alignment films, both are needed in the prior art, can be neglected, so that there can be achieved such an advantage that the steps of manufacturing the liquid crystal display device can be simplified. Further, since the alignment direction of the liquid crystal molecules can be decided by the projection patterns 35, 55, it is not needed to form the overcoat film on the CF substrate. Furthermore, in the second embodiment, since the width of the projection pattern 55 on the black matrix 52 is formed thicker than other portions, such a situation can be avoided that the pattern width of the projection pattern 55 on the black matrix 52 is narrowed upon forming the projection pattern 55. Therefore, a height of the projection pattern 55 for holding the cell thickness can be formed uniformly and thus variation of the cell thickness can be suppressed.

Also, in the second embodiment, as shown in FIG. 7, the slits may be provided to the pixel electrodes 32 instead of forming the projections 35 on the TFT substrate 30 side.

(Third Embodiment)

Figure 14:
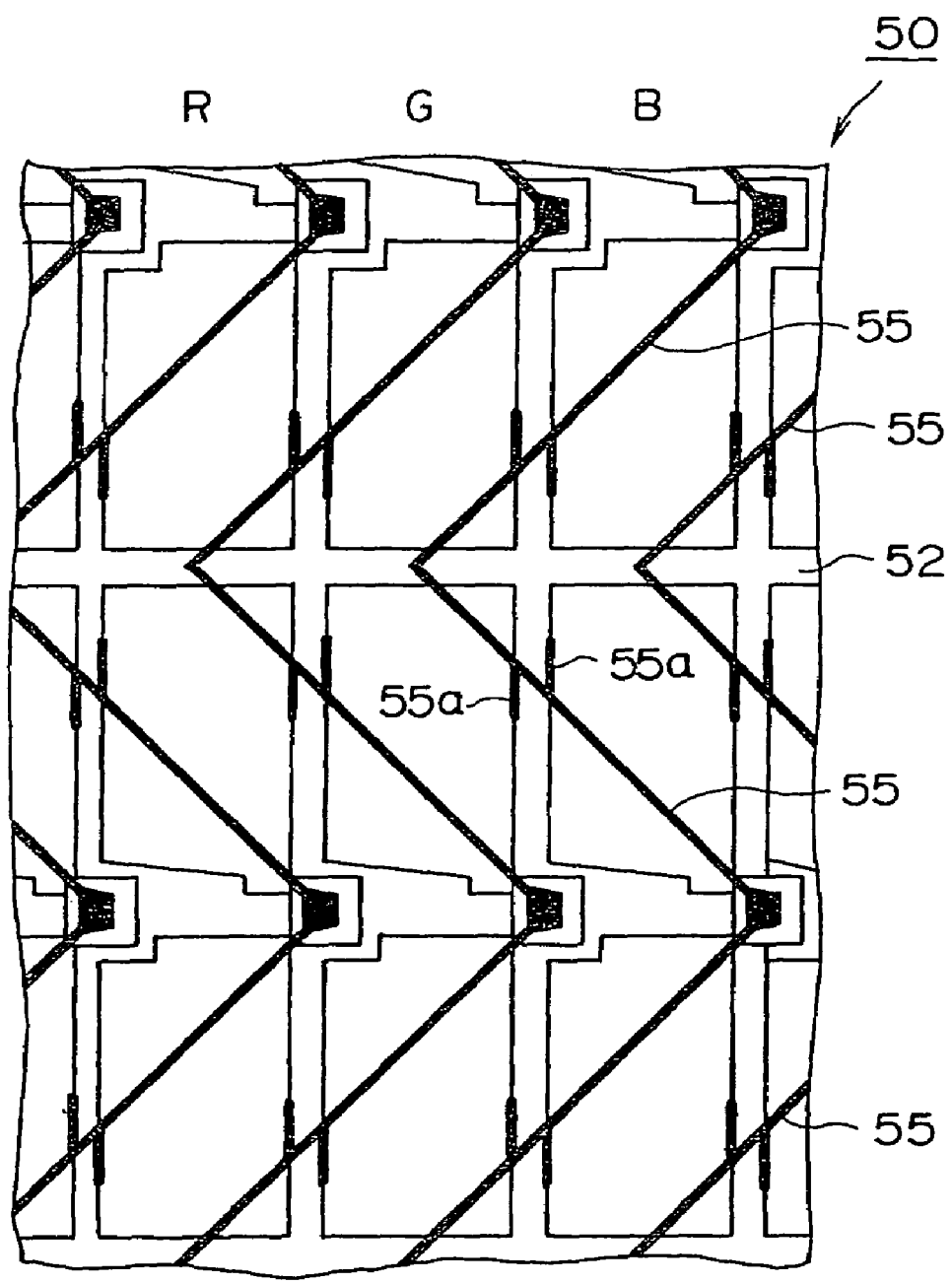
FIG. 14 is a plan view showing the CF substrate of the liquid crystal display device according to the third embodiment.

FIG. 12 is a sectional view showing a liquid crystal display device according to a third embodiment of the present invention. FIG. 14 is a plan view showing the CF substrate of the liquid crystal display device according to the third embodiment. A difference of the third embodiment from the second embodiment is that a structure of the CF substrate side is different. Because remaining portions of the third embodiment are basically similar to those of the second embodiment, the same symbols are affixed to the same constituent elements in FIGS. 12 and 14 as those in FIGS. 10 and 11 and their detailed explanation will be omitted hereunder.

The red (R) color filter 53R, the green (G) color filter 53G, and the blue (B) color filter 53B are formed on the glass substrate 51 on the CR substrate 50 side. These color filters 53R, 53G, 53B are overlapped as a triple layer at positions which to coincide with the gate bus lines 33b, the drain bus lines 33a, TFTs and the auxiliary capacitance electrodes on the TFT substrate 30 to form the black matrix 52. Each thickness of these color filters 53R, 53G, 53G is about 1.5 μm. These color filters 53R, 53G, 53G are formed by coating red resin, green resin, and blue resin. In this case, if the color filters 53R, 53G, 53G are formed in this manner, thicknesses of the color filters 53R, 53G, 53G on the overlapping area (black matrix 52) are slightly thinner than those of the color filters 53R, 53G, 53G in the flat areas (pixel regions).

The opposing electrode 54 formed of ITO is formed on these color filters 53R, 53G, 53B to have a thickness of about 0.15 μm. Then, as shown in FIG. 14, the projection pattern 55 of about 1.5 μm height is formed of insulating resin on the opposing electrode 54 in a zig-zag fashion. The width of the projection pattern 55 becomes thick at four corner portions of each pixel region. Further, it is preferable that, as shown in FIG. 14, strength of the projection pattern 55 located at positions where the projection pattern 55 intersects with the black matrix 52 should be reinforced by providing projection pattern 55a.

The vertical alignment film 56 formed of the polyamic acid is formed on the opposing electrode 54, and surfaces of the projection patterns 55, 55a are covered with the alignment film 56.

A method of manufacturing a liquid crystal display device according to the third embodiment will be explained with reference to FIGS. 15A to 15E hereunder. In this case, since the method of manufacturing the TFT substrate is similar to that in the first embodiment, their explanation will be omitted in this disclosure.

Figure 15A:
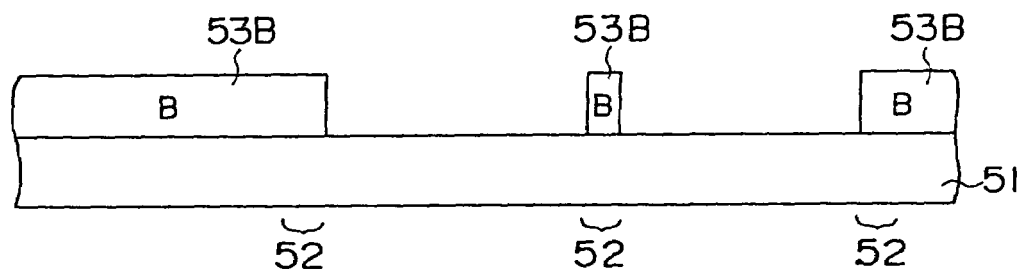
FIGS. 15A to 15E are sectional views showing a method of manufacturing the CF substrate of the liquid crystal display device according to the third embodiment.

First, as shown in FIG. 15A, the color filter 53B is formed by coating the blue resin on the blue pixel region and the area serving as the black matrix 52 on the glass substrate 51 to have an about 1.5 μm thickness.

Figure 15B:
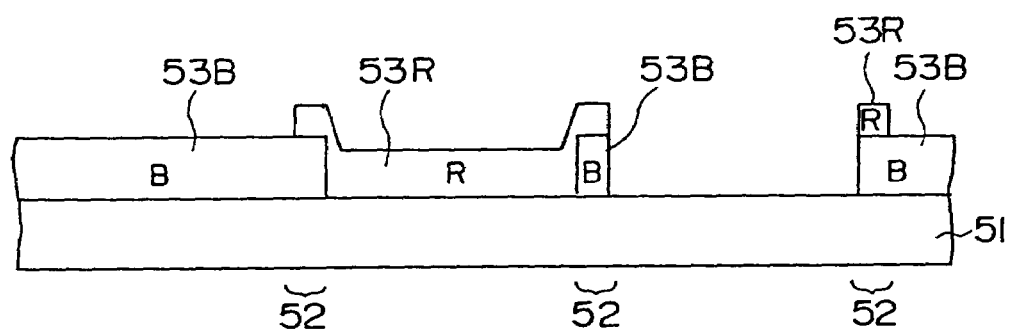
Figure 15C:
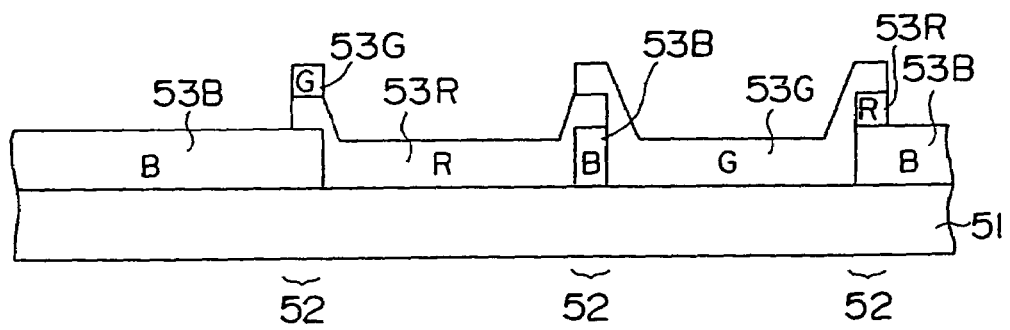

Then, as shown in FIG. 15B, the color filter 53R is formed by coating the red resin on the red pixel region and the area serving as the black matrix 52 on the glass substrate 51 to have an about 1.5 μm thickness. Then, as shown in FIG. 15C, the color filter 53G is formed by coating the green resin on the green pixel region and the area serving as the black matrix 52 on the glass substrate 51 to have an about 1.5 μm thickness.

Figure 15D:
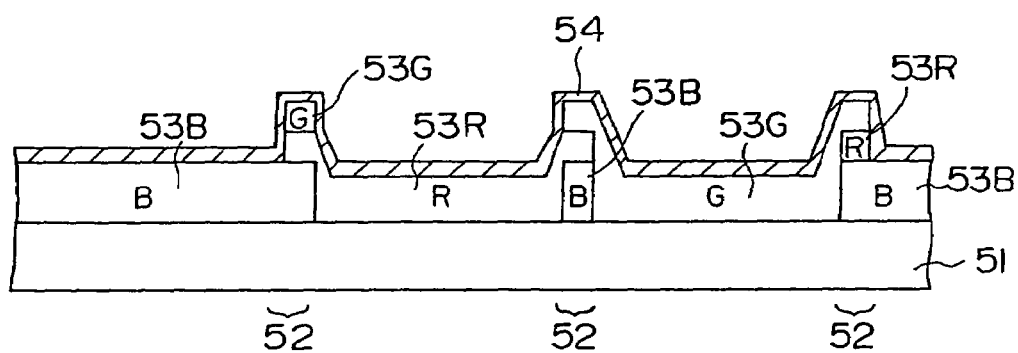
Figure 15E:
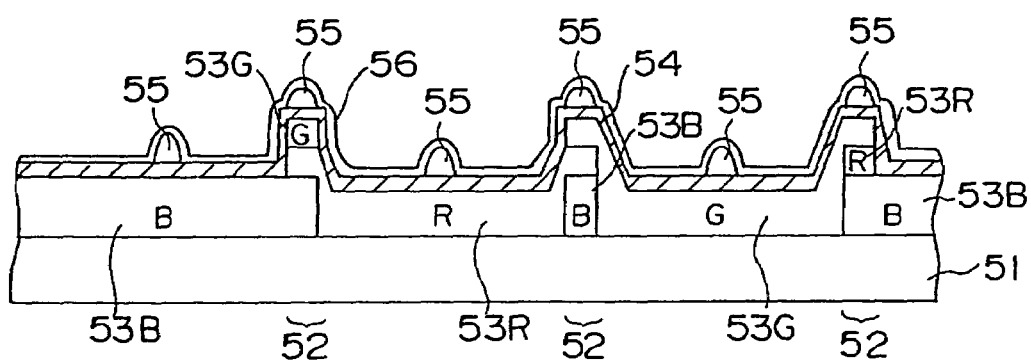

Then, as shown in FIG. 15D, the opposing electrode 54 is formed by coating ITO on the entire upper surface of the glass substrate 51 to have a thickness of about 0.15 μm. Then, as shown in FIG. 15E, the projection pattern 55 is formed by coating photosensitive resin on the opposing electrode 54, then exposing the photosensitive resin via an exposure mask having the projection pattern, and then applying the development process. Then, the vertical alignment film 56 is formed by coating the polyamic acid onto the glass substrate 51 to have a thickness of about 0.1 μm.

Then, as shown in FIG. 12, the TFT substrate 30 and the CF substrate 50 are superposed while directing their surfaces, on which the alignment films 36, 56 are formed respectively, toward the inside, and then the liquid crystal 49 having the negative electrostatic anisotropy is sealed into a clearance between them. At this time, the TFT substrate 30 and the CF substrate 50 come into contact with each other by the projection pattern 55 on the black matrix 52, so that the cell thickness can be kept constant. As a result, the liquid crystal display device according to the third embodiment is completed.

In the third embodiment, the black matrix 52 is formed by superposing the color filters 55R, 55G, 55B of three colors R•G•B. Therefore, since the step of forming the black matrix 52 by coating the black resin, which is needed in the second embodiment, can be omitted and in addition the step of scattering the spacers and the step of applying the rubbing process can be neglected, the manufacturing steps can be much more simplified. Although the black matrix 52 is formed by superposing three colors R•G•B in this example, more than two color filters including the blue color filter having the highest light shielding property may be superposed to form the black matrix. For example, since the light shielding rate (OD value) exceeds 2.0 (the transmittance is less than $1\times10^{-2}$) by superposing the red and the blue, sufficient light shielding property can be achieved by merely superposing the red and blue color filters 55R, 55B.

In addition, in the third embodiment, portions of the black matrix 52 are protruded from other portions by overlapping the color filters 55R, 55G, 55B, and then the projection pattern 55 is formed thereon so as to bring the CF substrate 50 into contact with the TFT substrate 30 via the projection pattern 55, so that the cell thickness is kept constant. Therefore, there is no possibility that the cell thickness is varied by the vibration and the impact, and thus the good display quality can be maintained.

In the above embodiments, the color filters 53R, 53G, 53B are formed by coating the red resion, the green resion, the blue resion on the glass substrate. However, these color filters may be formed by the thermal transfer film (dry film). If the color filters are formed by coating the resin like the above embodiments, such a phenomenon, i.e., so-called leveling occurs that the resin flow from the high portion to the low portion until drying of the resin is completed. For this reason, according to the cell thickness, it is difficult to form the black matrix having a predetermined height by overlapping the color filters. In such case, the black matrix having a predetermined height can be formed by employing the thermal transfer film.

For example, the blue color filter 53B is formed by thermally transferring (laminating) the blue thermal transfer film whose coloring layer has a thickness of 2.0 µm onto the overall surface of the glass substrate 51 and then applying the exposure and development processes. Then, the red color filter 53R is formed by thermally transferring the red thermal transfer film onto the overall surface of the glass substrate 51 and then applying the exposure and development processes. Then, the green color filter 53G is formed by thermally transferring the green thermal transfer film onto the overall surface of the glass substrate 51 and then applying the exposure and development processes.

According to this method, since the coloring layer is transferred onto the glass substrate 51 under the temperarily dried condition, the leveling is not caused at the overlapped portions of the color filters. Finally, each thickness of the color filters 53R, 53G, 53B is about 1.5 µm. Therefore, the black matrix having a total film thickness of about 4.5 µm can be formed.

Figure 16:
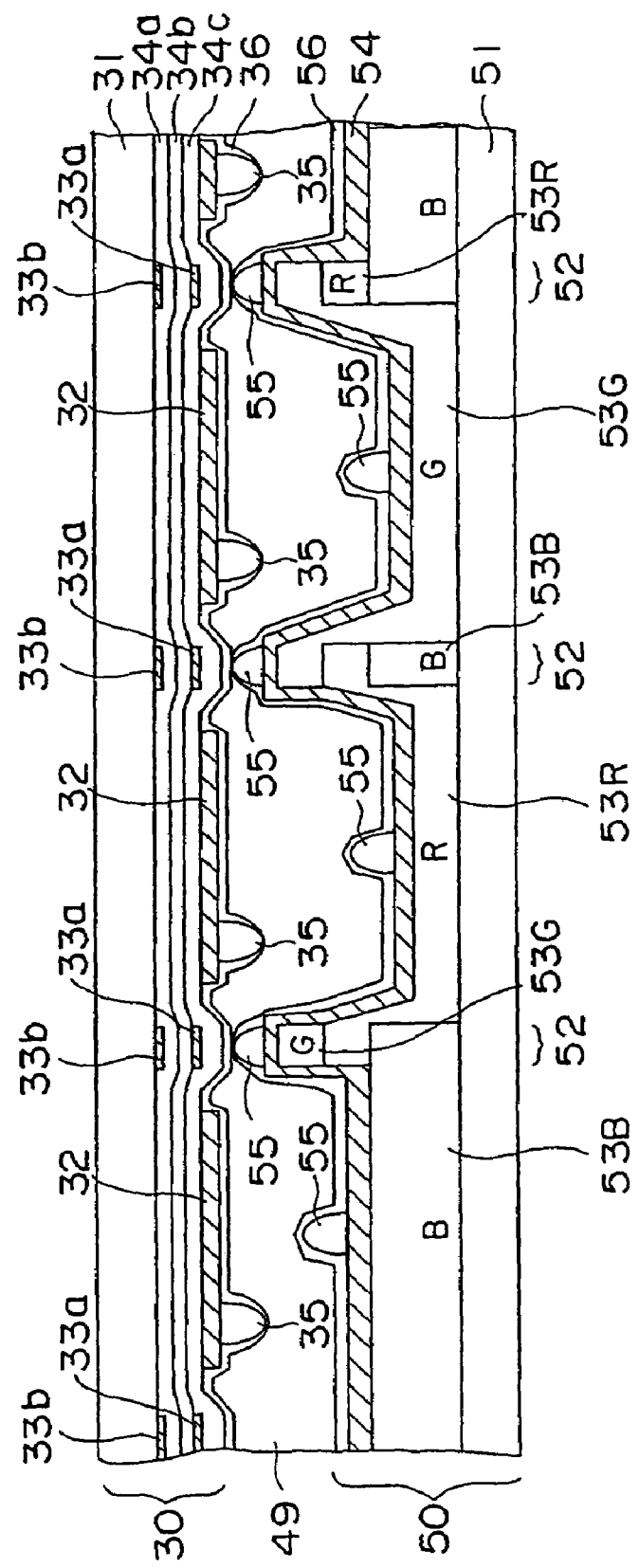
FIG. 16 is a sectional view showing a variation of the liquid crystal display device according to the third embodiment.

FIG. 16 is a sectional view showing a variation of the liquid crystal display device according to the third embodiment. In this example, a thickness of the blue (B) color filter 53B is formed thicker than thicknesses of other color filters 53R, 53G. More particularly, the thickness of the blue (B) color filter 53B is set to about 2.0 µm, and each thickness of the red and green color filters 53R, 53G is set to about 1.5 µm. Accordingly, the cell thickness is about 3.5 µm in the blue pixel portion and the cell thickness is about 4.0 µm in the red and green pixel portions.

Figure 17:
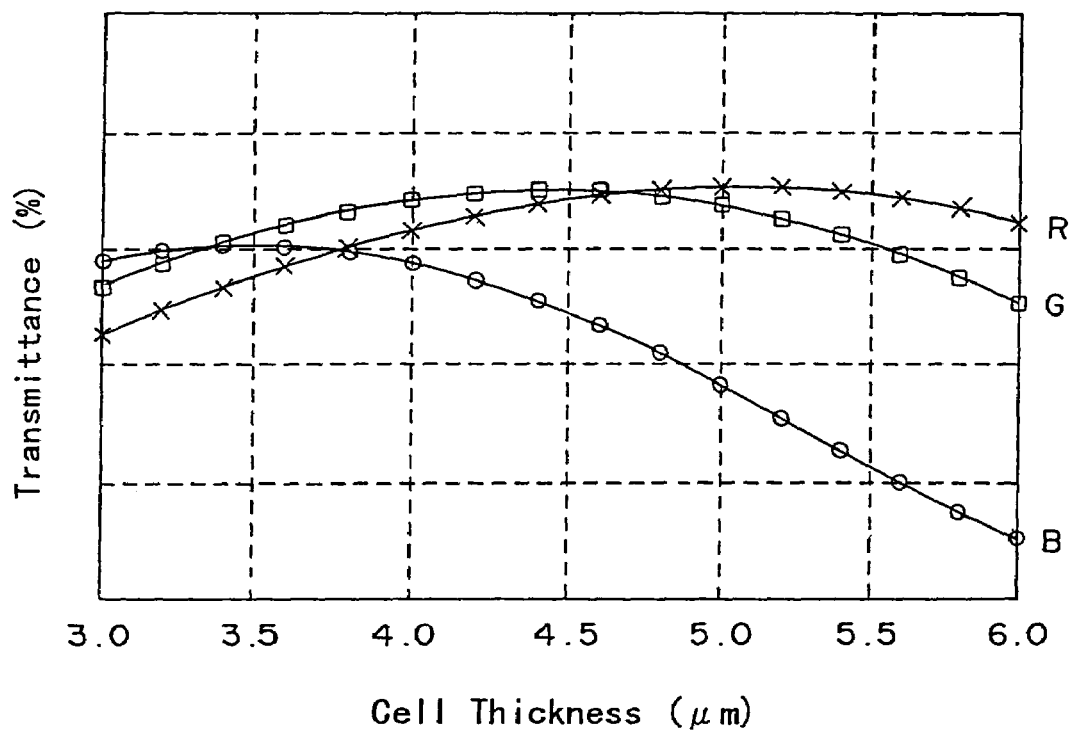
FIG. 17 is a graph showing relations between a cell thickness and a transmittance when red, green, and blue color filters are employed.

FIG. 17 is a graph showing relations between the cell thickness (thickness of the liquid crystal layer) in respective color pixels and the transmittance of the light, wherein an abscissa denotes the cell thickness and an ordinate denotes the transmittance of the light (relative value). As evident from FIG. 17, in the case of the blue (B) pixel, the transmittance has a peak around about 3.5 µm of the thickness of the liquid crystal layer. In contrast, in the case of the red (R) and green (G) pixels, the transmittance has a peak around about 4.0 to 4.5 µm of the thickness of the liquid crystal layer.

In this way, the optical characteristic Δnd can be optimized by adjusting the thickness of the liquid crystal layer every color (every pixel) of the color filters. As a result, in the case of the normally black mode liquid crystal display device, such an advantage can be achieved that characteristics such as the chromaticity characteristic, the transmittance characteristic, the contrast, etc. can be improved.

(Fourth Embodiment)

Figure 18:
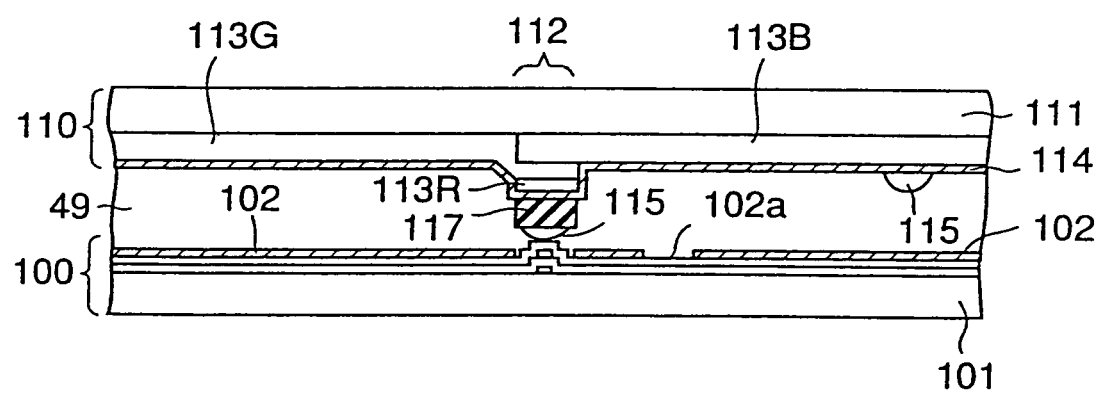
FIG. 18 is a sectional view showing a liquid crystal display device according to a fourth embodiment of the present invention.
Figure 19:
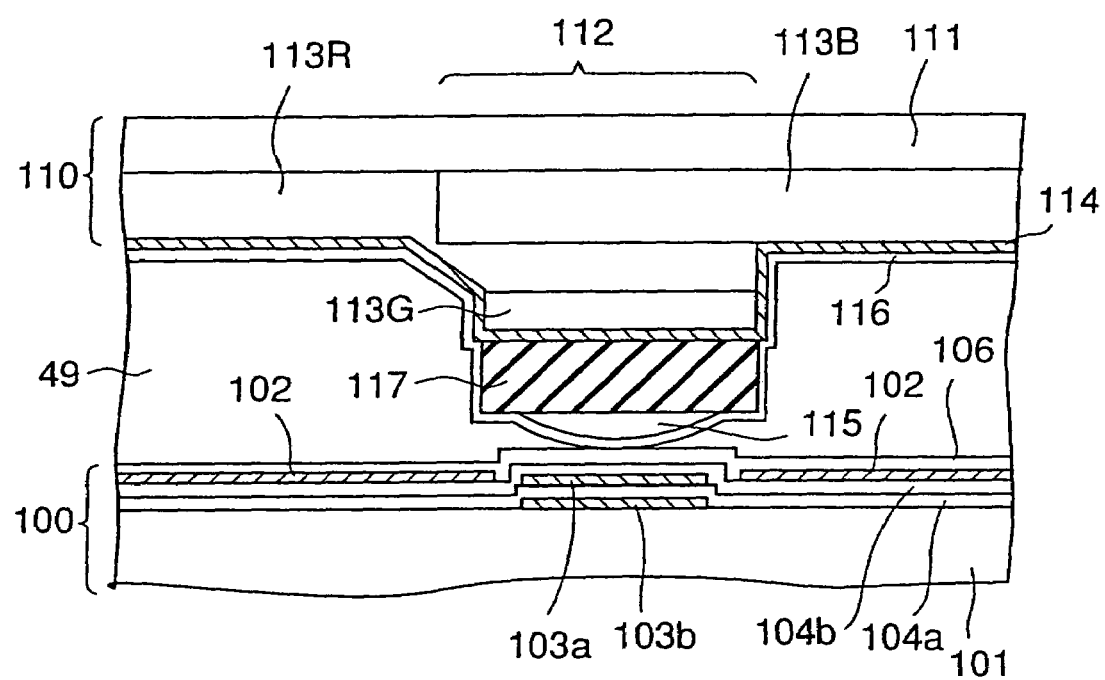
FIG. 19 is a sectional view showing a part of the liquid crystal display device in FIG. 8 in an enlarged fashion.
Figure 20:
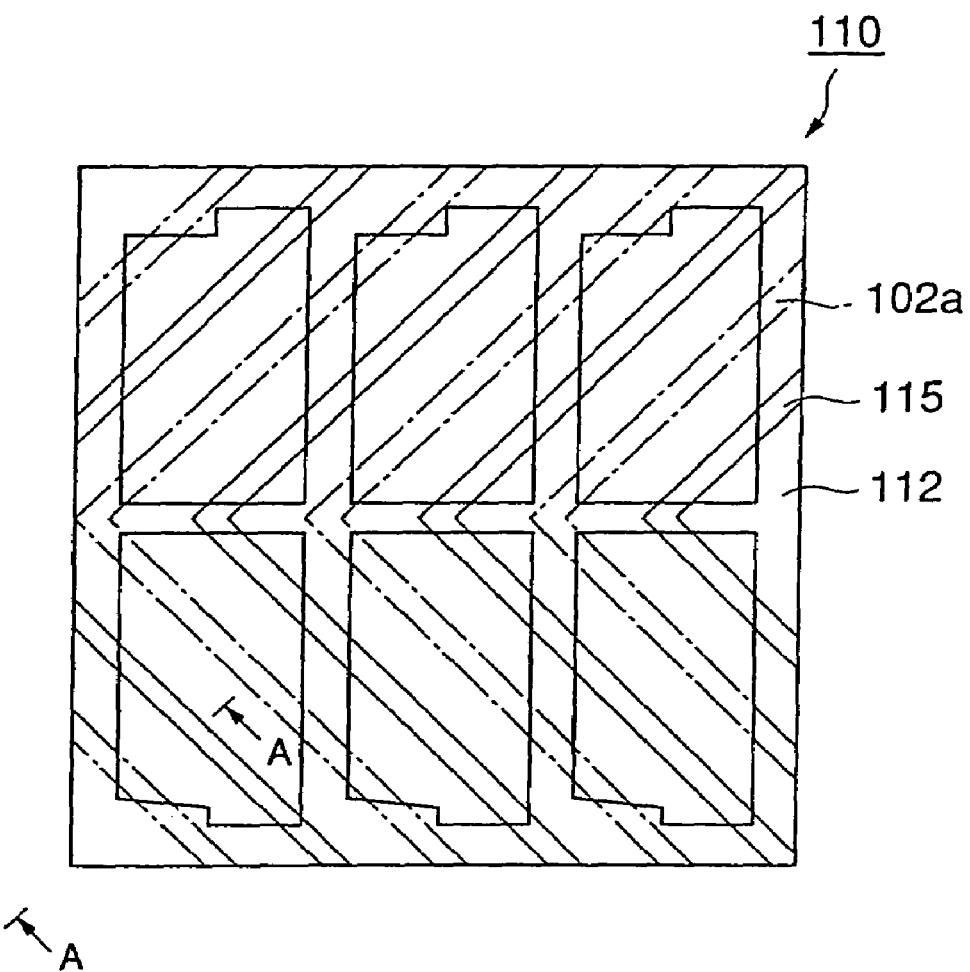
FIG. 20 is a plan view showing the CF substrate of the liquid crystal display device according to the fourth embodiment.
Figure 21:
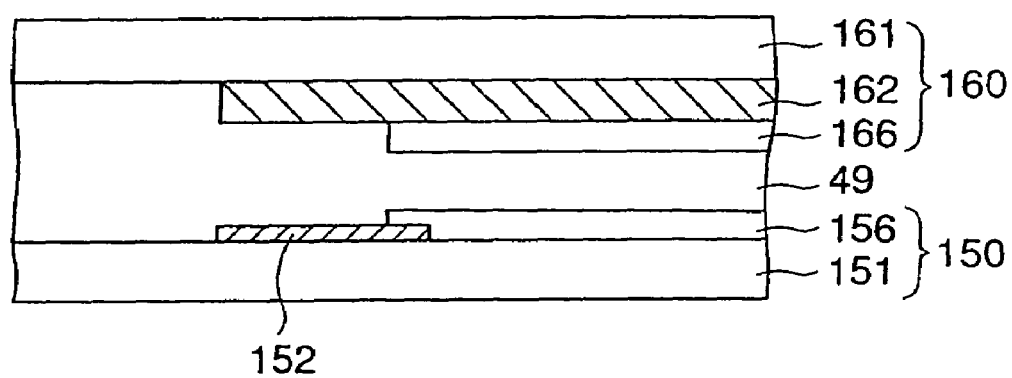
FIG. 21 is a sectional view showing a liquid crystal display device according to an eighth embodiment of the present invention.

FIG. 18 is a sectional view showing a liquid crystal display device according to a fourth embodiment of the present invention. FIG. 19 is a sectional view showing a part of the liquid crystal display device in FIG. 18 in an enlarged fashion. FIG. 20 is a plan view showing a CF substrate 110 of the liquid crystal display device according to the fourth embodiment. In FIGS. 18 and 19, the CF substrate 110 is depicted on the upper side and a TFT substrate 100 is depicted on the lower side. Also, in FIG. 18, illustration of alignment films 106, 116 shown in FIG. 19 is omitted. In addition, in FIG. 20, a slit 102a provided in a pixel electrode 102 on the TFT substrate 100 side is indicated by a dot-dash line. FIG. 21 is a sectional view showing the sectional shape taken along a line A—A in FIG. 20.

The liquid crystal display device according to the fourth embodiment has a structure in which the liquid crystal 49 having the negative dielectric anisotropy is sealed between the TFT substrate 100 and the CF substrate 110. The polarizing plates (not shown) are arranged on the lower side of the TFT substrate 100 and the upper side of the CF substrate 110 respectively. These polarizing plates are arranged such that their polarization axes intersect with each other.

The TFT substrate 100 consists of a glass substrate 101, pixel electrodes 102 formed on the upper surface side of the glass substrate 101, insulating films 104a, 104b, an alignment film 106, TFTs, etc. More particularly, as shown in FIG. 19, a plurality of gate bus lines 103b, a plurality of drain bus lines 103a, and pixel electrodes 102 formed of ITO are formed on the upper surface side of the glass substrate 101. The gate bus lines 103b and the drain bus lines 103a are isolated by insulating film 104a respectively. The drain bus lines 103a and the pixel electrodes 102 are isolated by insulating film 104b respectively. Slits 102a are provided to the pixel electrodes 102 to decide the alignment direction of the liquid crystal molecules (see FIG. 7). As shown in FIG. 20, the slits 102a are provided in a zig-zag fashion to partition the pixel into plural areas. Also, the vertical alignment film 106 is formed on the overall upper surface of the glass substrate 101, and the surfaces of the pixel electrodes 102 are covered with the vertical alignment film 106.

In the meanwhile, the CF substrate 110 consists of a glass substrate 111, color filters 113R, 113G, 113B formed on the lower surface side of the glass substrate 111, an opposing electrode 114, a vertical alignment film 116, etc. More particularly, as shown in FIG. 19, the red (R), green (G), and blue (B) color filters 113R, 113G, 113B are formed on the lower surface of the glass substrate 111. Any one color filter of the red, green, and blue color filters 113R, 113G, 113B are arranged in respective pixel electrodes. Also, the color filters 113R, 113G, 113B are overlapped in pixel-to-pixel regions as a triple layer so as to constitute the black matrix 112. The opposing electrode 114 made of ITO is formed on the lower surface side of the glass substrate 111 to cover the black matrix 112 and these color filters 113R, 113G, 113B.

Cell thickness adjusting layers 117 made of insulating resin are formed under portions of the black matrix 112 at which the data bus lines 103a intersect with the gate bus lines 103b.

In addition, as shown in FIG. 20, the projection pattern 115 is formed on the opposing electrode 114 and under the cell thickness adjusting layers 117 in a zig-zag fashion. Further, the vertical alignment film 116 is formed on the whole lower surface of the opposing electrode 114. Surfaces of the opposing electrode 114 and the projection pattern 115 are covered with the vertical alignment film 116.

The TFT substrate 100 and the CF substrate 110 are arranged such that their surfaces on which the vertical alignment films 102, 116 are formed are opposed to each other. A distance (cell thickness) between the TFT substrate 100 and the CF substrate 110 can be kept constant by bringing the projection patterns 115 formed on the lower side of the cell thickness adjusting layers 117 on the CF substrate 110 into contact with intersection portions between the gate bus lines 103b and the drain bus lines 103a on the TFT substrate 100. Where the portion of maintaining the cell thickness between the TFT substrate and the CF substrate constant is called the spacer portion hereinafter.

FIGS. 22A to 22F are sectional views showing a method of manufacturing the CF substrate of the liquid crystal display device according to the fourth embodiment in the order of step. In FIGS. 22A to 22F, the CF substrate is depicted while setting a surface on which the color filters are formed upwardly.

Figure 22A:
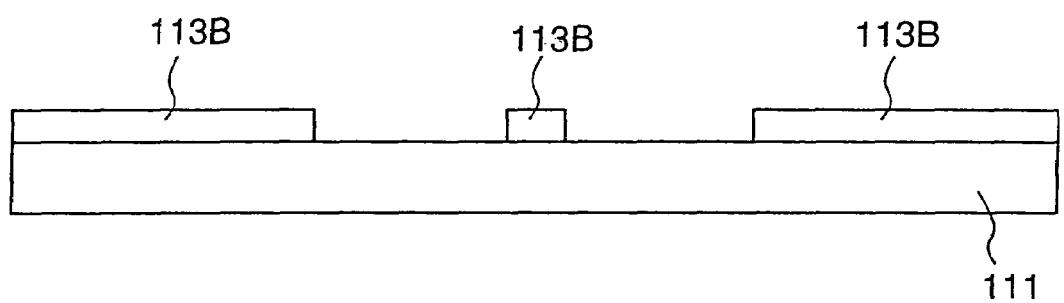
FIGS. 22A to 22F are sectional views showing a method of manufacturing the CF substrate of the liquid crystal display device according to the fourth embodiment.

First, as shown in FIG. 22A, the blue color filter 113B of a 1.5 μm thickness is formed in the blue pixel regions, the black matrix forming area, and the mark forming areas such as alignment marks (not shown) on the glass substrate 111. Photosensitive resist into which blue pigment is scattered is used as material of the blue color filter 113B. This blue color filter 113B can be formed by coating the photosensitive resist on the glass substrate 111 and then applying the exposure and development processes.

Figure 22B:
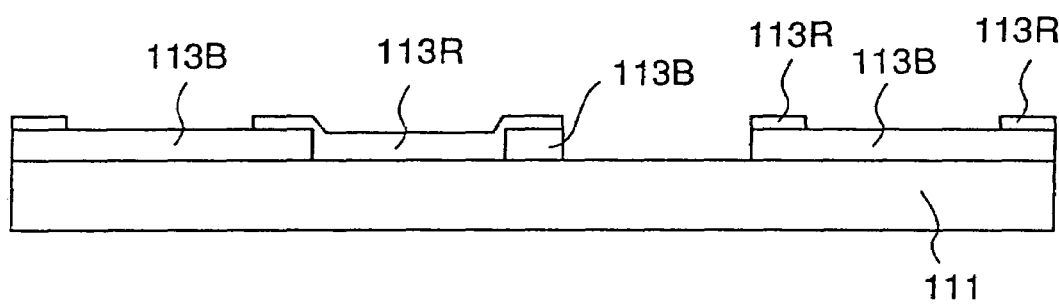

Then, as shown in FIG. 22B, the red color filter 113R of a 1.5 μm thickness is formed in the red pixel regions and the black matrix forming area on the glass substrate 111 by using the red pigment-distributed photosensitive resist.

Figure 22C:
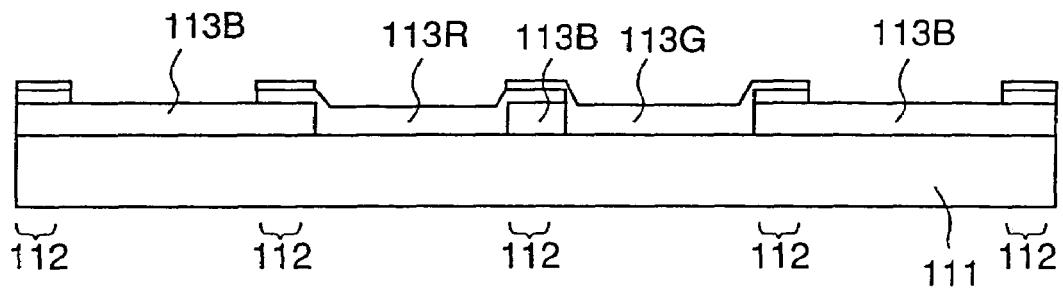

Then, as shown in FIG. 22C, the green color filter 113G of a 1.5 μm thickness is formed in the green pixel regions and the black matrix forming area on the glass substrate 111 by using the green pigment-distributed photosensitive resist.

In the fourth embodiment, the black matrix is formed by overlapping the color filters 113R, 113G, 113B. In this case, thicknesses of the filters become thin in the overlapped portion of the filters rather than the pixel regions. In case each thickness of the color filters 113R, 113G, 113B is set to 1.5 μm as described above, a height of the overlapped portion (a projection height from a surface of the color filter in the pixel region) is about 1.8 μm.

Figure 22D:
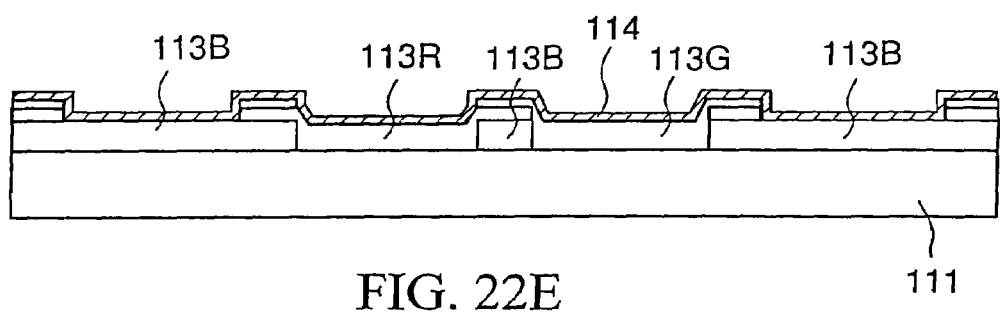

Then, as shown in FIG. 22D, an opposing electrode 114 is formed by forming ITO on the overall upper surface of the glass substrate 111 to have a thickness of 150 nm.

Figure 22E:
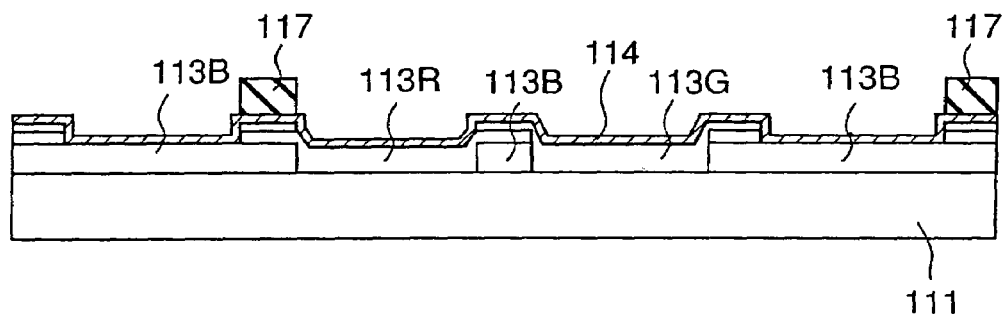

Then, as shown in FIG. 22E, the cell thickness adjusting layers 117 of an about 3.0 μm height are formed in predetermined areas (spacers) on the opposing electrode 114. For example, the positive novolak resin (photosensitive resist) may be employed as material of the cell thickness adjusting layer 117. In this case, the cell thickness adjusting layers 117 are formed by coating the novolak resin on the entire upper surface of the glass substrate 111 and then applying the exposure and development processes.

Figure 22F:
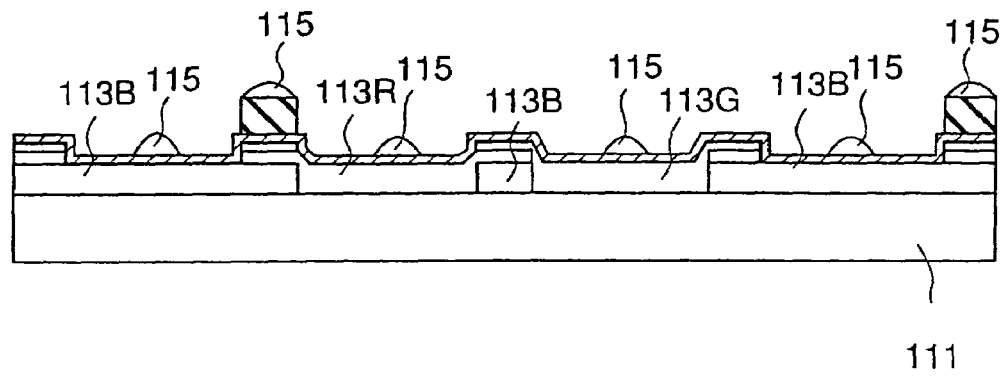

Then, as shown in FIG. 22F, the projection pattern 115 of an about 1.5 μm height is formed on the upper surface of the glass substrate 111. In this case, the height of the projection pattern 115 is slightly lowered in the overlapped portions of the color filters. The projection pattern 115 may be formed by using the positive novolak resin.

Then, the alignment film 116 is formed in the whole upper surface of the glass substrate 111. As a result, the CF substrate 110 is completed. In this example, a height of the spacer portion (a projection height from a surface of the color filter in the pixel region) becomes about 4.0 μm.

In the above example, the case where the color filters 113R, 113G, 113B are formed by using the pigment-distributed photosensitive resist is explained. However, the color filters 113R, 113G, 113B may be formed by using other material. For example, the color filters may be formed by coating the resin containing the dye or the pigment and then patterning the resin into a predetermined profile by virtue of etching. In addition, the color filters may be formed by using the printing, etc.

Moreover, in the above example, the cell thickness adjusting layers 117 are formed by coating the novolak resin. However, the cell thickness adjusting layers 117 may be formed by other material such as acrylic resin, polyimide resin, epoxy resin, etc.

Advantages achieved by the liquid crystal display device according to the fourth embodiment will be explained hereunder.

In the photosensitive resist as material of the color filters 113R, 113G, 113B, the acrylic resin is employed as the binder of the coloring material (pigment). In the fourth embodiment, the photosensitive novolak resin is employed as material of the projection pattern 115. Because this material has good flatness, a thickness of the overlapped portion of the color filters becomes thinner than that in the pixel region (flat portion).

Normally, in the event that this resin is coated by the spinner, the slit coater, etc., the leveling of the resin occurs in the second and third overlying layers until the resin is dried, so that the thickness of the second-layer color filter is reduced up to about 70% of the first layer, and also the thickness of the third-layer color filter is reduced up to about 50% of the first layer.

Since the cell thickness is decided by the thickness of the overlapped portions of the color filters if the cell thickness adjusting layers 117 is not provided at all, the thickness of the color filters in the overlapped portions of the color filters must be increased. In order to increase the thicknesses of the second and third color filters, the method of reducing the leveling by accelerating the dry by means of vacuum drying and the method of increasing a thickness of the coated resin film may be thought about, for example. However, coating irregularity or drying unevenness occurs according to these methods, and thus yield of fabrication is lowered.

Figure 23:
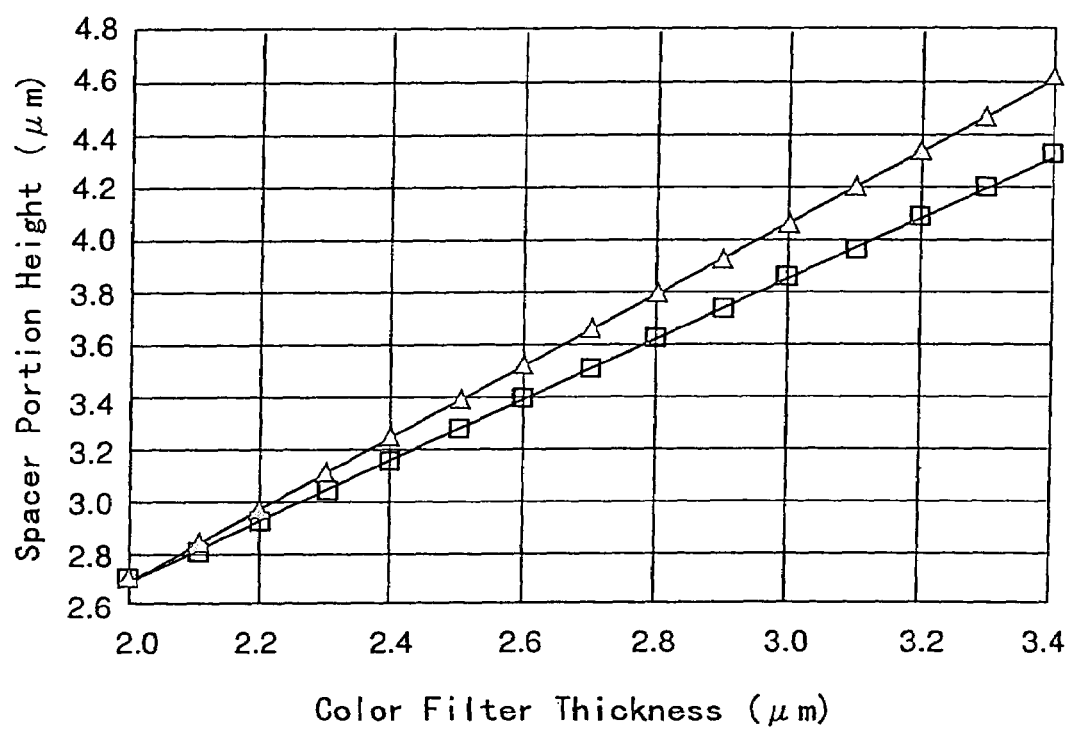
FIG. 23 is a graph showing relations between a thickness of a color filter and a height of a spacer portion.

FIG. 23 is a graph showing relations between the thickness of the color filter and a height of a spacer portion, wherein an abscissa denotes the thickness of the color filter in the pixel region and an ordinate denotes the height of the spacer portion. In this case, a ▲ mark indicates the height of the spacer portion when the thickness of each color filter is equal to the height of the projection pattern, and a □ mark indicates the height of the spacer portion when the height of the projection pattern is set to 2 µm constantly. As can be seen from FIG. 23, in order to set the cell thickness to 4 µm, both the thickness of each color filter in the pixel regions and the height of the projection pattern must be set to 3 µm. In this case, if the height of the projection pattern is less than 30% of the cell thickness or more than 50% of the cell thickness, reduction in the transmittance or reduction in the contrast is caused. Therefore, it is preferable that the height of the projection pattern should be set to 1.2 to 2.0 µm, and the thickness of the color filter must be set further thicker if so.

Normally, if a thickness of the pigment-scattered resist as material of the color filters exceeds 3 µm, fine patterning of such resist becomes difficult. Such a problem is caused that productivity is lowered since the drying speed is reduced after the resist has been coated. Therefore, it is not practical to set the thickness of the color filter to more than 3 µm.

It may be considered that the material having the poor flatness such as polyimide resin is employed as material of the color filters. However, since the polyimide resin is photoinsensitive resin, the etching step is needed in patterning. Therefore, there is such a drawback that a fabrication cost is increased because of the increase in the number of steps. If the color filter is formed thick, short-circuit failure is ready to occur because a distance between the opposing electrode in the spacer portions and the pixel electrodes on the TFT substrate side comes extremely close.

In the fourth embodiment, as described, since the cell thickness adjusting layers 117 are provided between the overlapped portions of the color filters 113R, 113G, 113B and the projection pattern 115 and thus the cell thickness can be adjusted by the cell thickness adjusting layers 117, the sufficient cell thickness can be held even if each thickness of the color filters 113R, 113G, 113B is set to less than 3 µm. As a result, reduction in the productivity and reduction in the yield of fabrication can be avoided. Also, since the color filters are formed of the photosensitive resist, increase in the number of steps can be prevented rather than the case where the color filters are fabricated by the photoinsensitive resin such as the polyimide resin. Further, since the cell thickness can be relatively easily adjusted into the optimum value by the projection pattern 115, both reduction in the transmittance and reduction in the contrast can be prevented. Moreover, since the sufficient interval can be assured between the opposing electrode 114 and the pixel electrodes 102 on the TFT substrate 100 side by the cell thickness adjusting layers 117, generation of the short-circuit defect can be prevented even if the alignment films 106, 116 are broken down at contact portions.

Figure 24:
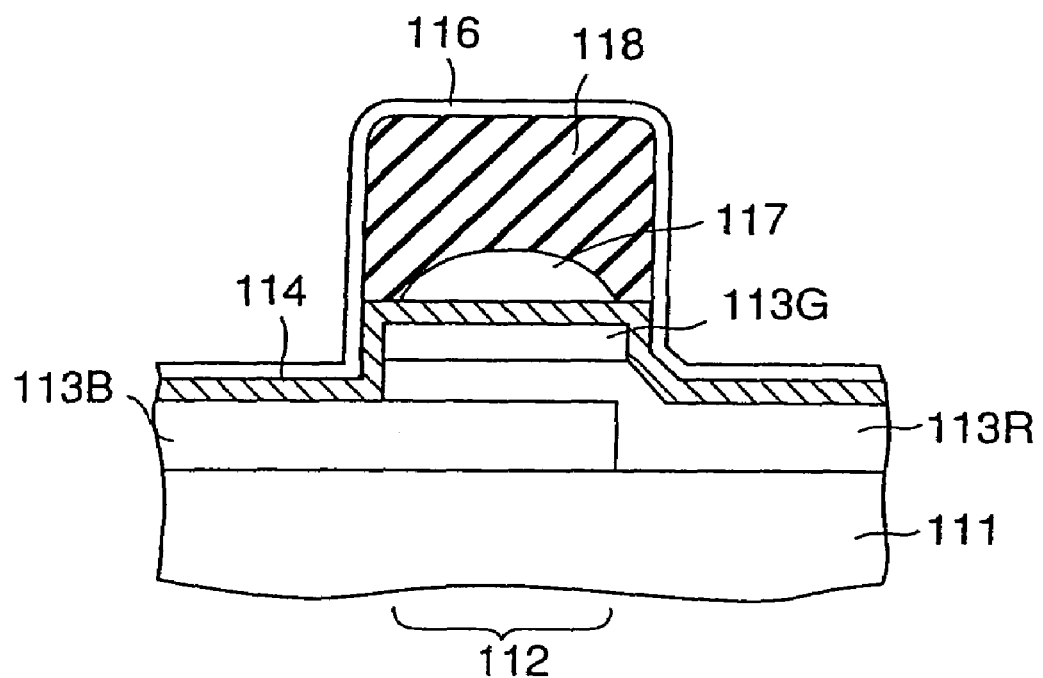
FIG. 24 is a sectional view showing a variation of the liquid crystal display device according to the fourth embodiment.

The cell thickness adjusting layers 117 are formed and then the projection pattern 115 is formed in the fourth embodiment, but these steps may be conducted reversely. In other words, as shown in FIG. 24, a projection pattern 117 is formed on the opposing electrode 114, and then cell thickness adjusting layers 118 are formed on the projection pattern 117 of the spacer portions. In this case, similar advantages to those in the above fourth embodiment can be achieved.

Although the black matrix 112 is formed by superposing the color filters 113R, 113G, 113B as a triple layer in the above fourth embodiment, such black matrix may be formed by superposing any two layers of color filters. In addition, in the event that short-circuit between the opposing electrode 114 and the pixel electrodes is never generated at the spacer portions, the opposing electrode 114 may be formed after a cell thickness adjusting layer 118 has been formed.

According to the forth embodiment, the cell thickness can be adjusted by the cell thickness adjusting layer 117 provided on the light shielding film 112. As a result, the cell thickness can be adjusted into an optimum value without increase of the thickness of the color filters 113R, 113G, 113B.

In this case, as shown in FIG. 24, the second f first electrodes on the first substrate, the light shielding film 112 formed by overlapping at least two color filters of these color filters 113R, 113G, 113B to be arranged in regions which correspond to regions between the plurality of first electrodes, a second electrode 116 for covering the color filters 113R, 113G, 113B and the light shielding film 112, a projection pattern 117 formed of insulating material on the second electrode, a cell thickness adjusting layer 118 formed on the projection pattern 117 over the light shielding film 112, and a second vertical alignment film 116 for covering at least the second electrode.

(Fifth Embodiment)

Figure 25:
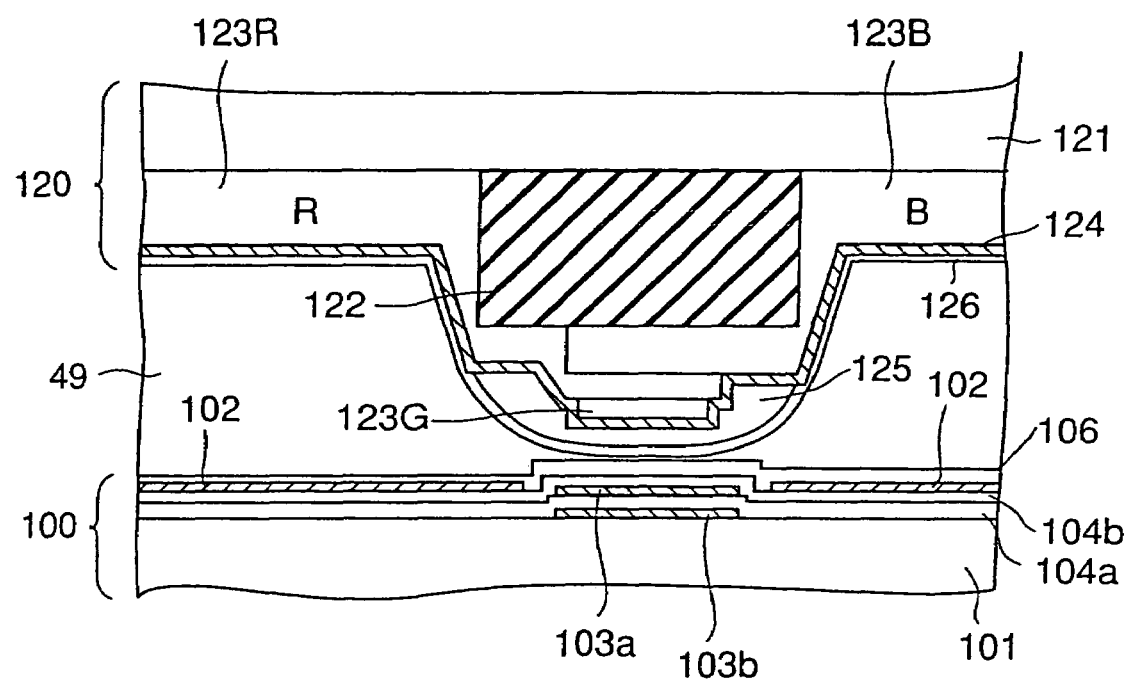
FIG. 25 is a sectional view showing a liquid crystal display device according to a fifth embodiment of the present invention.

FIG. 25 is a sectional view showing a liquid crystal display device according to a fifth embodiment of the present invention. Since a structure of the TFT substrate side is similar to the fourth embodiment, same symbols are affixed to the same constituent elements in FIG. 25 as those in FIG. 19 and their detailed description will be omitted hereunder.

The black matrix 122 formed of black resin is formed on one surface (lower surface in FIG. 25) of a glass substrate 121 of the CF substrate 120 side to form a predetermined pattern. A thickness of the black matrix 122 formed of black resin is 3.5 µm, for example. Also, the black matrix 122 is formed by coating the photosensitive resist into which the black pigment is scattered, and then patterned by the exposure and development processes.

Color filters 123R, 123G, 123B of red (R), green (G), and blue (B) are formed in pixel regions on the lower surface of the glass substrate 121 respectively. These color filters 123R, 123G, 123B are formed as three layers on a lower surface of the black matrix 124.

Also, an opposing electrode 124 made of ITO is formed on a lower surface side of the glass substrate 121 to cover the color filters 123R, 123G, 123B. Then, a projection pattern 125 is formed under the opposing electrode 124. Like the fourth embodiment, this projection pattern 125 is arranged between the slits 102a of the pixel electrodes 102 provided on the TFT substrate 110 side (see FIG. 20).

A vertical alignment film 126 is formed on an under surface of the opposing electrode 124, and surfaces of the projection pattern is covered with the vertical alignment film 126.

In the fifth embodiment, since the cell thickness is adjusted by the resin black matrix 124, the optimum cell thickness can be achieved without the increase in thickness of the color filters or the increase in height of the projection pattern, like the fourth embodiment. Accordingly, the advantage similar to the fourth embodiment can be achieved by the fifth embodiment.

Although the case where the color filters 123R, 123G, 123B are overlapped to form the three layers on the lower surface of the black matrix 124 is explained in the fifth embodiment, one layer or two layer color filters may be formed under the black matrix 124. If there is no possibility that the opposing electrode 124 and the pixel electrodes 102 are short-circuited, the opposing electrode 124 may be formed after the projection pattern 125 has been formed.

In addition, the color filters may not be overlapped on the resin black matrix 122 in portions other than the spacer portions, or the color filters may be overlapped as in the spacer portions. However, it is preferable that, if the projections whose height exceeds ⅓ of the cell thickness in the portions other than the spacer portions are formed, the projections should be covered with an insulating layer (insulating layer formed of the same material as the projection pattern 125) formed simultaneously with the projection pattern 125. As a result, generation of short-circuit between the pixel electrodes 102 on the TFT substrate 100 side and the opposing electrode 124 on the CF substrate 120 side can be prevented more precisely.

According to the fifth embodiment, since the cell thickness can be adjusted by the light shielding film 122 formed of the light non-transmitting material such as black resin, the cell thickness can be adjusted into the optimum value without the increase of the thickness of the color filters 123R, 123G, 123B.

Figure 26:
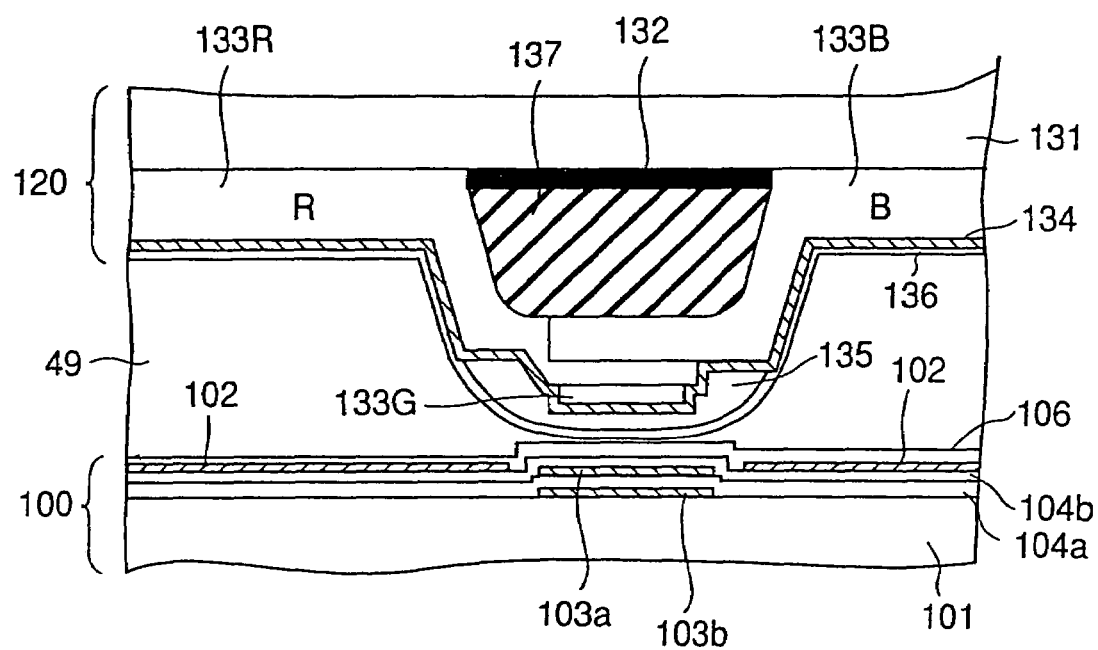
FIG. 26 is a sectional view showing a liquid crystal display device according to a sixth embodiment of the present invention.

In this case, as shown in FIG. 26, the light shielding film may consist of the film (light shielding film) 132 formed of metal or metal compound and the resist 137 formed on the film 132.

According to the present invention, the resist 137 used in patterning the light shielding film 132 is left to bring top end portions of the projection pattern 135 formed on the resist 137 into contact with the first substrate 100. Therefore, the cell thickness can be kept constant. As a result, there is such an advantage that the manufacturing steps can be simplified.

(Sixth Embodiment)

FIG. 26 is a sectional view showing a liquid crystal display device according to a sixth embodiment of the present invention. In this sixth embodiment, since the structure of the TFT substrate side is similar to that in the fourth embodiment, same symbols are affixed to the same constituent elements in FIG. 26 as those in FIG. 19 and their detailed explanation will be omitted hereunder.

The black matrix 132 formed of low reflection Cr (chromium) is formed on a lower surface side of the glass substrate 131 on the CF substrate 130 side. Then, resist 137 which has the same pattern as the black matrix 132 is formed under the black matrix 132.

The color filters 133R, 133G, 133B of the red (R), green (G), and blue (B) are formed in the pixel regions on the lower surface of the glass substrate 131. These color filters 133R, 133G, 133B are stacked as three layers under the black matrix 132.

The opposing electrode 134 formed of ITO is formed on the lower surface side of the glass substrate 131 to cover the color filters 133R, 133G, 133B. Further, the projection pattern 135 is formed under the opposing electrode 134. Like the fourth embodiment, this projection pattern is arranged between the slits 102a of the pixel electrodes 102 provided on the TFT substrate 110 side (see FIG. 20).

Further, the vertical alignment film 136 is formed under the opposing electrode 134, and the surface of the projection pattern 135 is covered with the vertical alignment film 136.

FIGS. 27A to 27F are sectional views showing a method of manufacturing the CF substrate 130 of the liquid crystal display device according to the sixth embodiment.

Figure 27A:
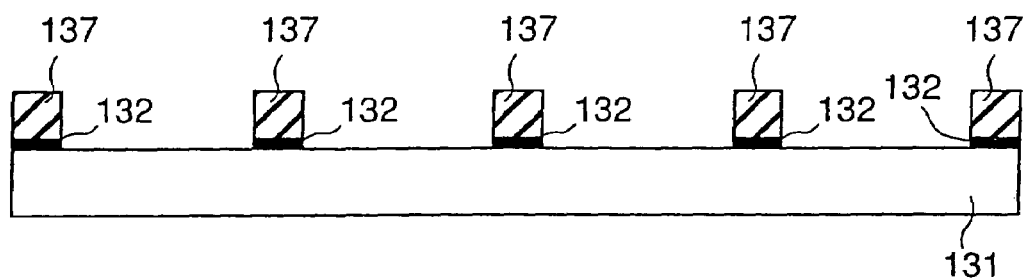
FIGS. 27A to 27F are views showing a method of manufacturing the CF substrate of the liquid crystal display device according to the sixth embodiment.

First, as shown in FIG. 27A, the low reflection Cr film is formed on the glass substrate 131 to have a thickness of about 0.16 μm, and then the photosensitive resist 137 formed of the positive novolak resin is formed thereon to have a thickness of about 4.0 μm. Then, a predetermined black matrix pattern is formed by exposing and developing the resist 137. Then, the Cr film is left only under the resist 137 by removing the Cr film being not covered with the resist 137 via etching. Thus, the Cr film being left under the resist 137 acts as the black matrix 132.

Figure 27B:
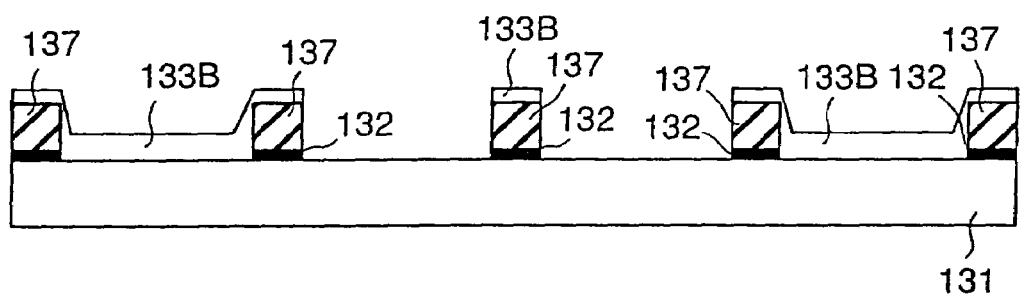

Then, as shown in FIG. 27B, the blue color filter 133B of a 1.5 μm thickness is formed on the glass substrate 131. The photosensitive resist into which blue pigment is scattered is employed as material of the blue color filter 133B. The blue color filter 133B can be formed by coating the photosensitive resist on the glass substrate 131, and then applying the exposure and development processes.

Figure 27C:
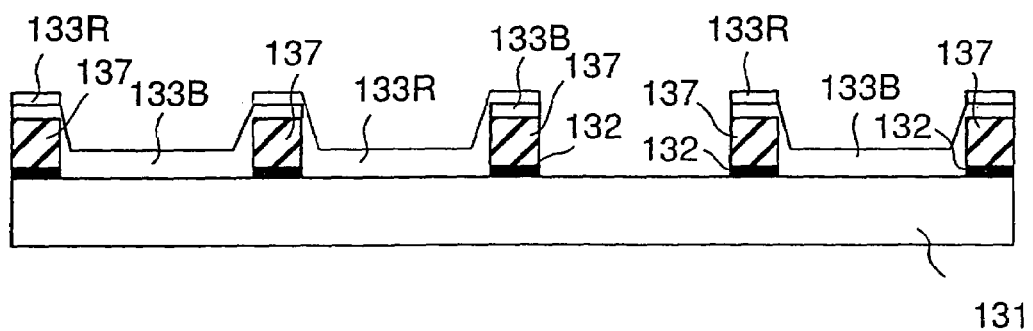

Then, as shown in FIG. 27C, the photosensitive resist into which red pigment is scattered is employed, and the red color filter 133R of a 1.5 μm thickness is formed on the glass substrate 131.

Figure 27D:
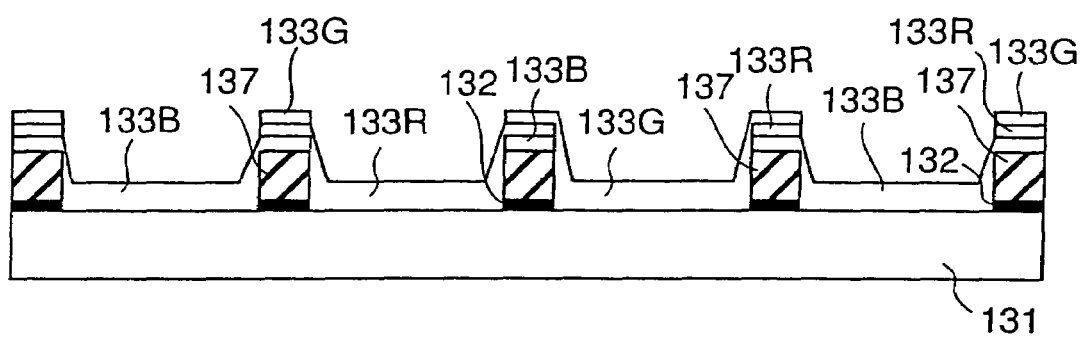

Then, as shown in FIG. 27D, the photosensitive resist into which green pigment is scattered is employed, and the green color filter 133G of a 1.5 μm thickness is formed on the glass substrate 131. A height of overlapped portions (a projection height from the filter surface of the pixel portions) of the low reflection Cr black matrix 132, the resist 137 on the black matrix 132, and the color filters 133R, 133G, 133B accomplished up to this steps is about 3.8 μm.

Figure 27E:
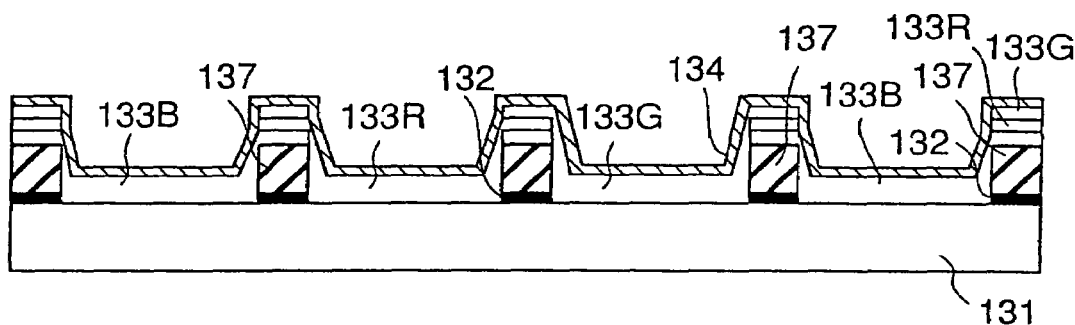

Then, as shown in FIG. 27E, the opposing electrode 114 formed of ITO is formed on the entire surface to have a thickness of 150 nm.

Figure 27F:
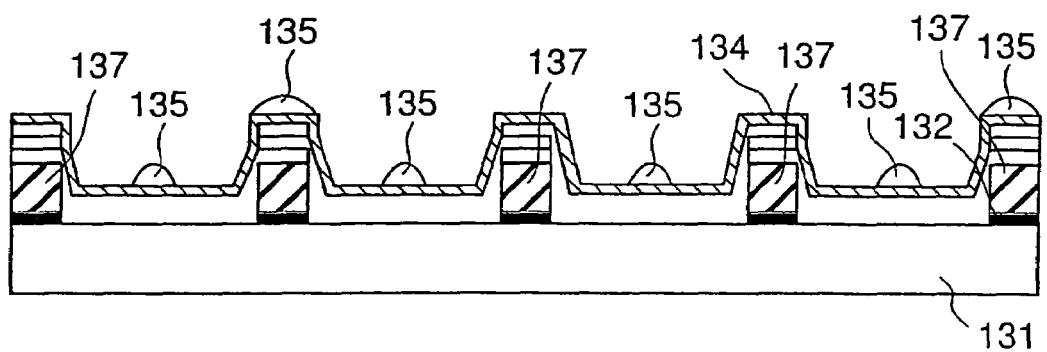

Then, as shown in FIG. 27F, the projection pattern 135 is formed on the opposing electrode 114 in a zig-zag fashion (see FIG. 20). A height of the projection pattern 135 is set to about 1.5 μm. The height of the projection pattern 135 becomes lower than 1.5 μm on the overlapped portion of the color filters. The positive novolak resin may be employed as material of the projection pattern 135.

Then, the alignment film 136 is formed on the overall upper surface of the glass substrate 131. As a result, the CF substrate is completed. In this example, the height of the spacer portion (projection height from the filter surface in the pixel region) becomes about 4.0 μm.

In the sixth embodiment, in addition to the similar advantage achieved by the fourth embodiment, there is such an advantages that, since the resist which is used upon forming the black matrix formed of the low reflection Cr is left as it is as the cell thickness adjusting spacers, the increase in the number of steps can be prevented.

Although the RGB color filters are overlapped on the resist 137 as the three layers in the sixth embodiment, a one layer or two layers structure may be employed. Also, in the sixth embodiment, the thickness of the color filter on the resist 137 becomes thin since the color filters are superposed on the resist 137. Therefore, it is preferable that, in order to keep the predetermined cell thickness, a total thickness of the black matrix 132 and the resist 137 should be made larger than the thickness of the color filters 133R, 133G, 133B in the pixel regions.

(Seventh Embodiment)

Figure 28:
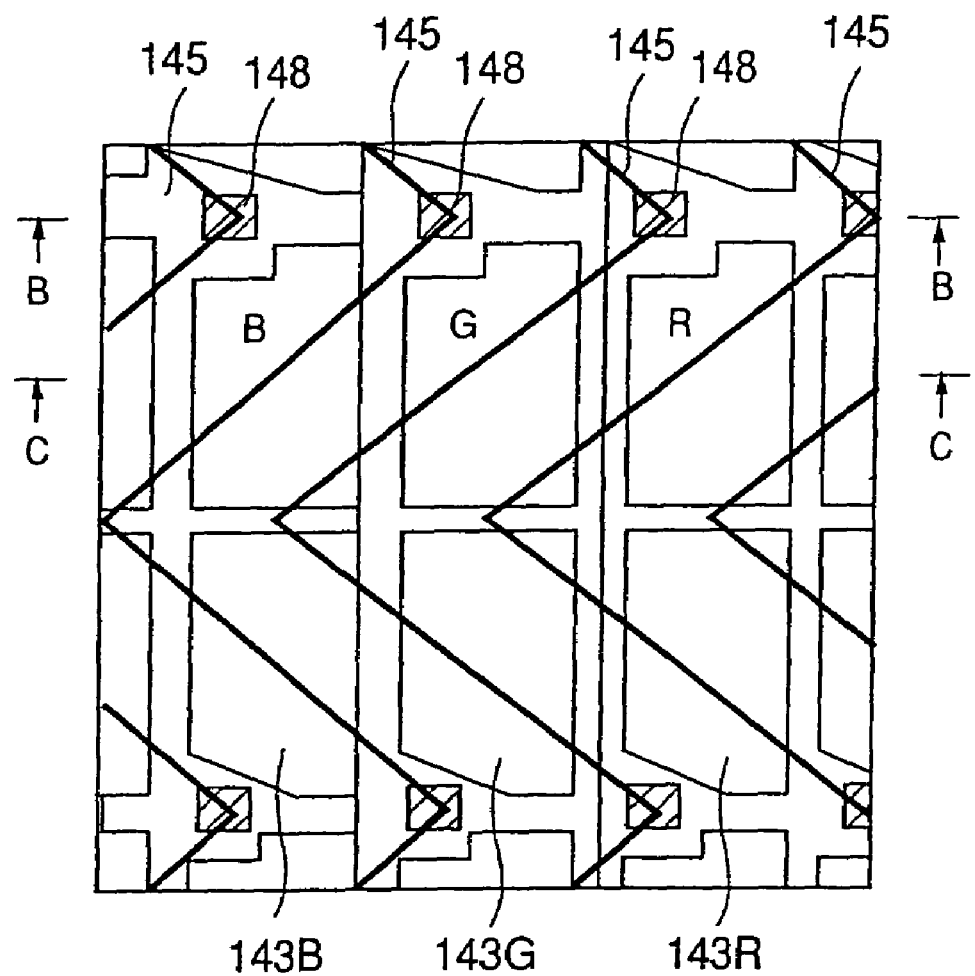
FIG. 28 is a sectional view showing a liquid crystal display device according to a seventh embodiment of the present invention.
Figure 29A:
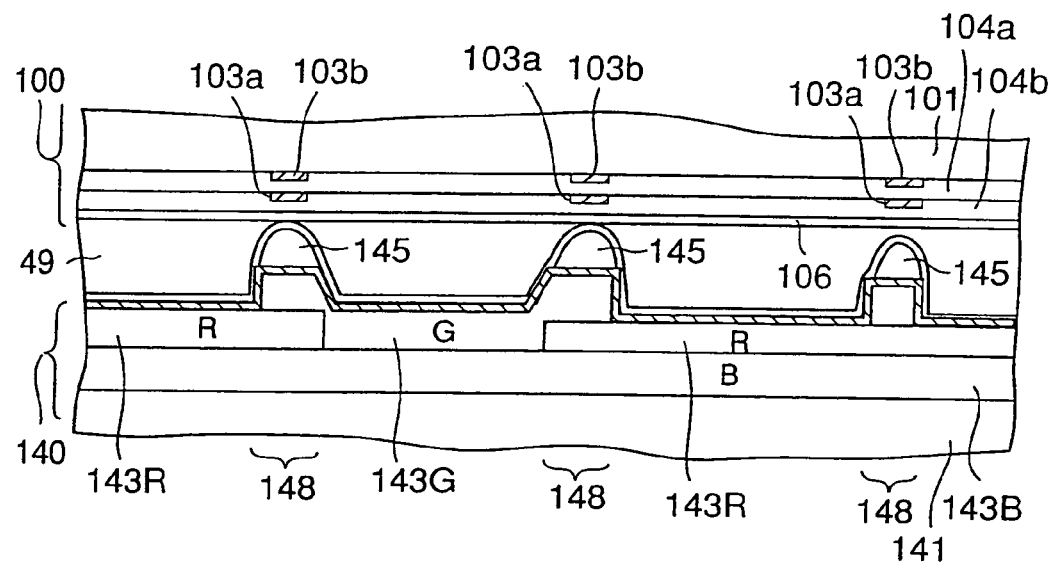
FIG. 29A is a sectional view showing a sectional shape taken along a line B—B in FIG. 15.
Figure 29B:
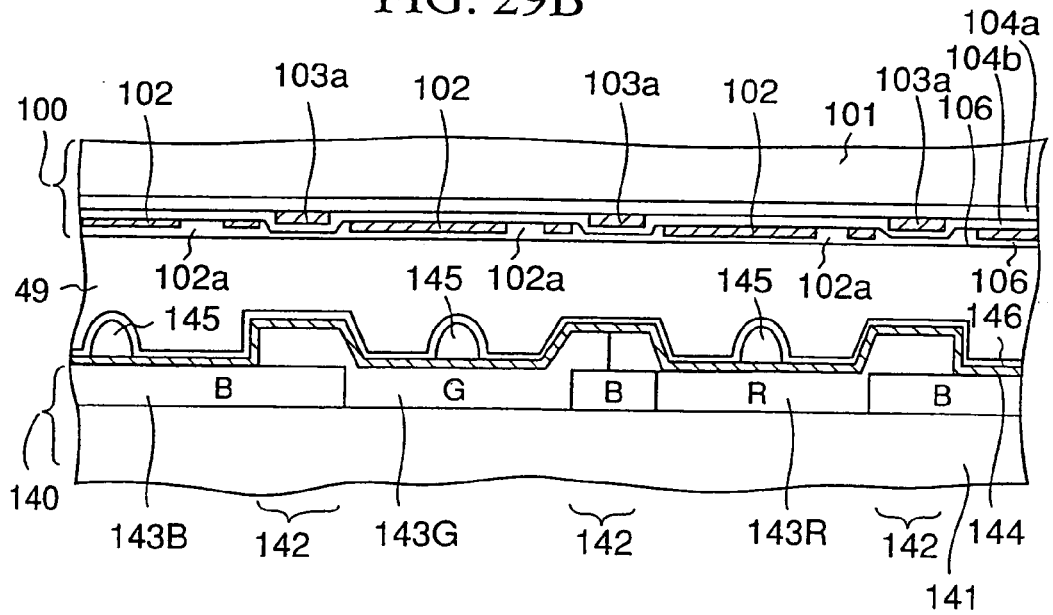
FIG. 29B is a sectional view showing a sectional shape taken along a line C—C in FIG. 15.

FIG. 28 is a sectional view showing a liquid crystal display device according to a seventh embodiment of the present invention. FIG. 29A is a sectional view showing a sectional shape taken along a line B—B in FIG. 28. FIG. 29B is a sectional view showing a sectional shape taken along a line C—C in FIG. 28. Since the structure of the TFT substrate side of the liquid crystal display device according to this seventh embodiment is similar to that in the fourth embodiment, same symbols are affixed to the same constituent elements in FIG. 29 as those in FIG. 19 and their detailed explanation will be omitted hereunder. In FIG. 29, the TFT substrate is depicted on the upper side and the CF substrate is depicted on the lower side.

The liquid crystal display device according to the seventh embodiment has a structure in which the liquid crystal 49 having the negative dielectric anisotropy is sealed between the TFT substrate 100 and the CF substrate 140. The polarizing plates (not shown) are arranged on the upper side of the TFT substrate 100 and the lower side of the CF substrate 140 respectively. These polarizing plates are arranged such that their polarization axes intersect with each other.

The CF substrate 140 consists of a glass substrate 141, color filters 143R(red), 143G(green), 143B(blue) formed on an upper side of the glass substrate 141, an opposing electrode 144, a vertical alignment film 146, etc. More particularly, as shown in FIG. 29, the color filters 143R, 143G, 143B are formed on the glass substrate 141. Any one color filter of these color filters 143R, 143G, 143B is arranged in each pixel region. Also, the blue color filter 143B and one of the red and green color filters 143R, 143G are overlapped in regions between the pixels as two layers to form the black matrix 142. Further, the color filters 143R, 143G, 143B are overlapped as three layers in spacer portions 148 which are located in the vicinity of the intersecting point of the drain bus lines 33a and the gate bus lines 33b.

The opposing electrode 144 made of ITO is formed on these color filters 143R, 143G, 143B. As shown in FIG. 20, the projection pattern 145 formed of insulating resin is formed on the opposing electrode 144 in a zig-zag fashion. The vertical alignment film 146 is formed to cover surfaces of the opposing electrode 144 and the projection patterns 145.

The CF substrate 140 constructed as above comes into contact with the TFT substrate 100 by top end portions of the projection pattern 145 on the spacer portions 148 to keep the cell thickness between the TFT substrate 100 and the CF substrate 140 constant. A size of the spacer portion 148 is 30 µm×30 µm.

Figure 30A:
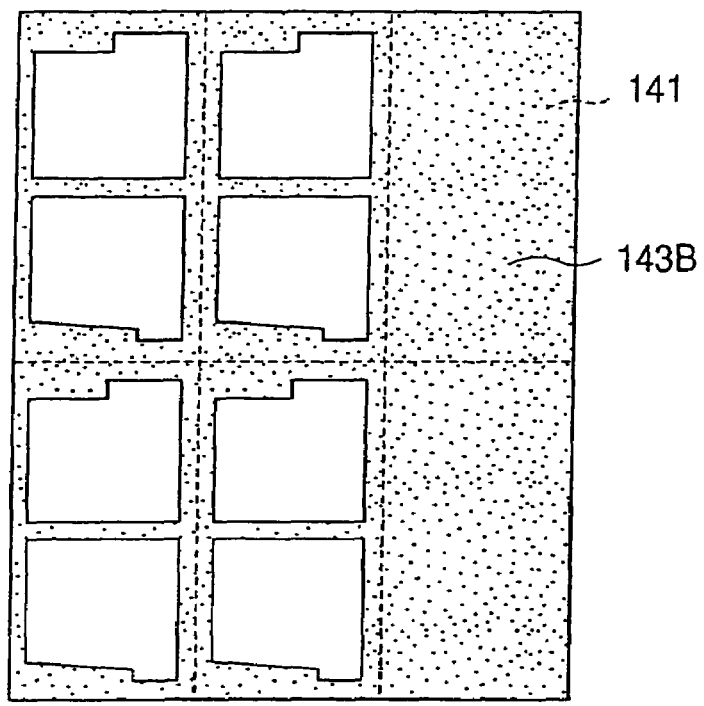
FIGS. 30A to 30C are plan views showing a method of manufacturing the CF substrate of the liquid crystal display device according to the seventh embodiment.
Figure 30B:
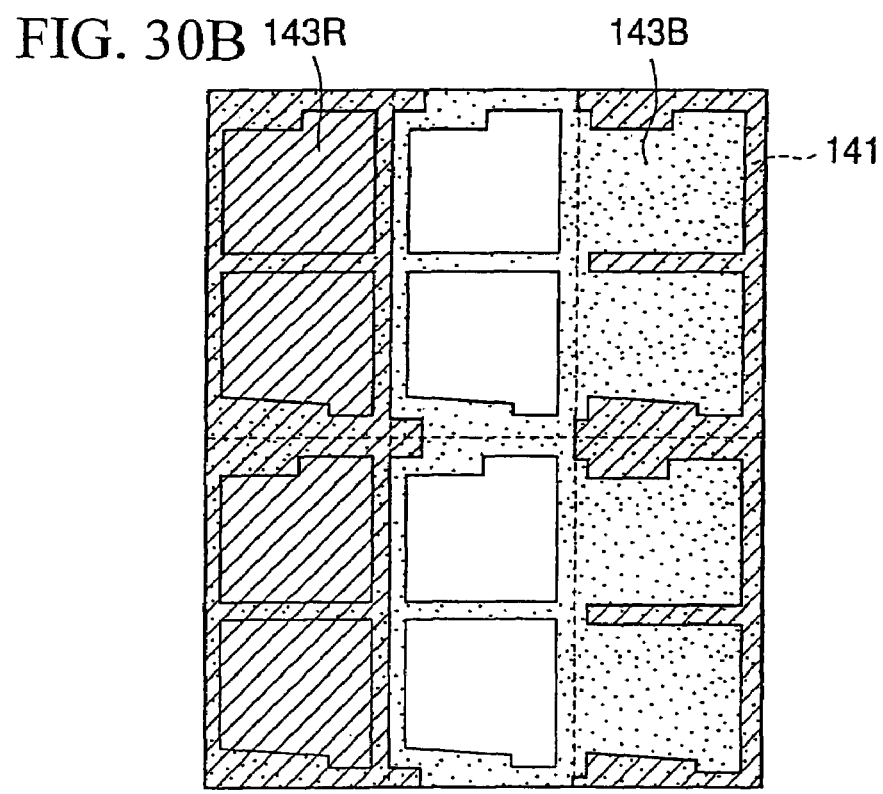
Figure 30C:
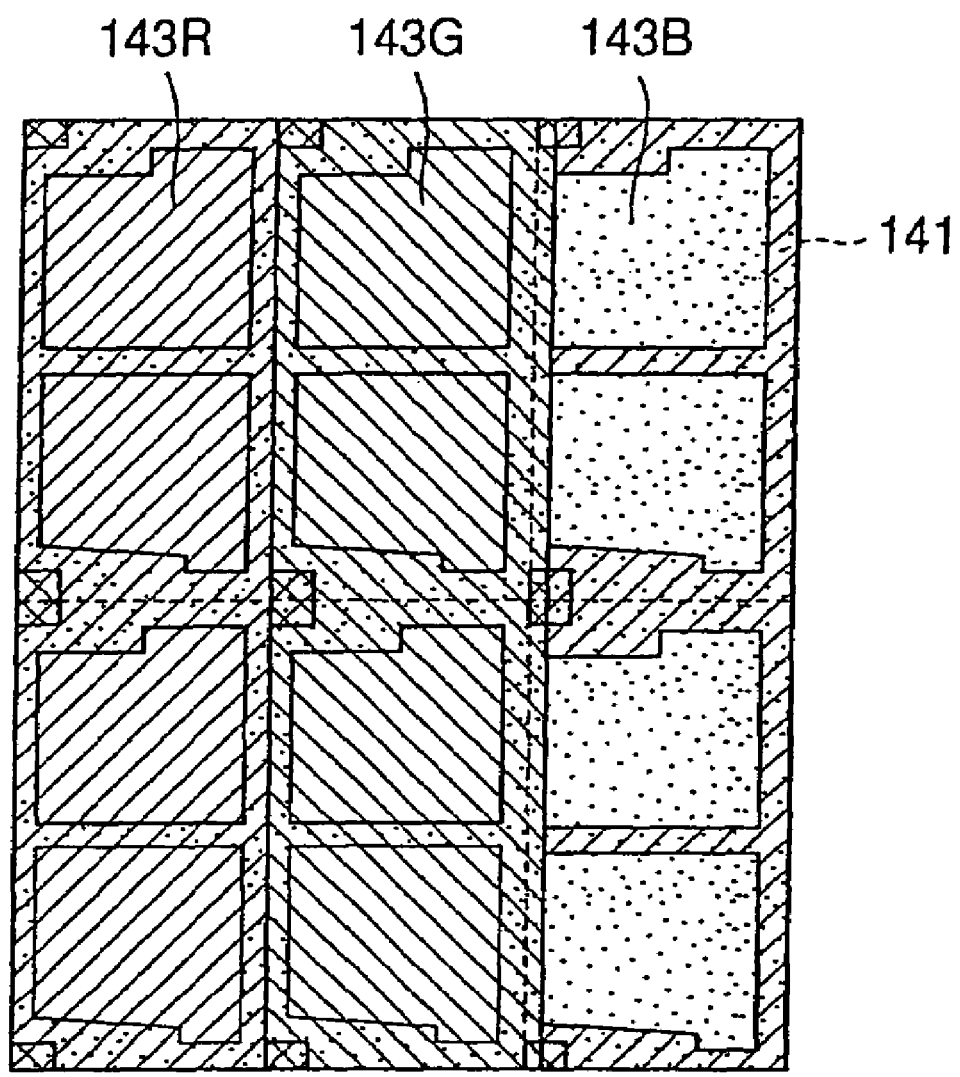
Figure 31A:
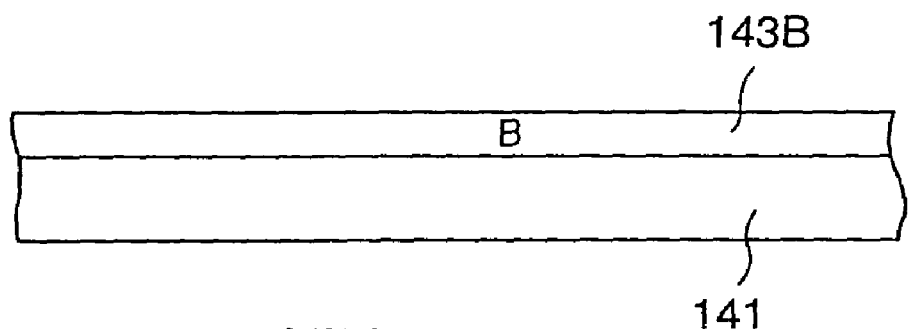
FIGS. 31A to 31C are sectional views showing the method of manufacturing the CF substrate of the liquid crystal display device according to the seventh embodiment.
Figure 31B:
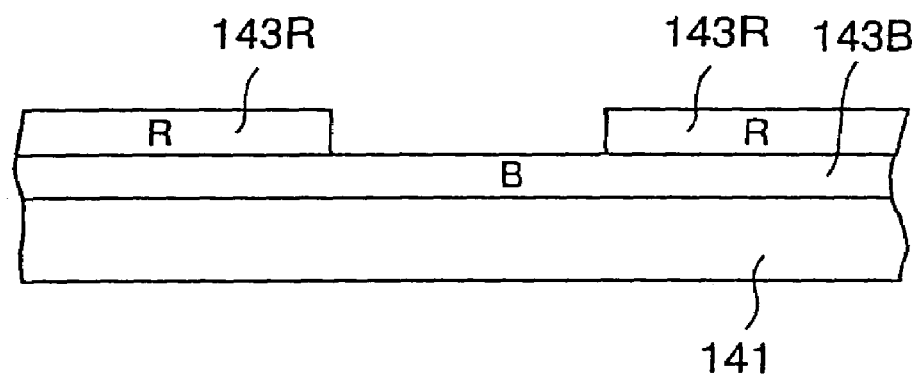
Figure 31C:
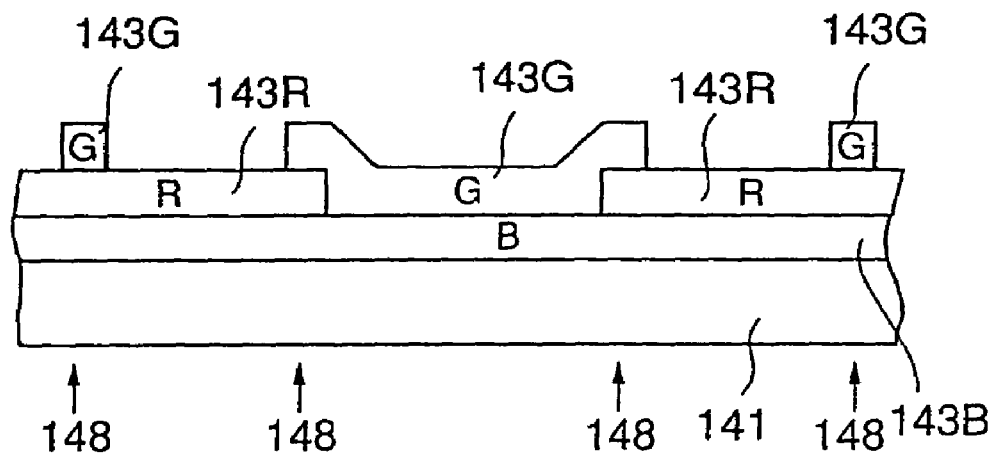

FIGS. 30A to 30C are plan views showing a method of manufacturing the CF substrate of the liquid crystal display device according to the seventh embodiment in the order of manufacturing step. FIGS. 31A to 31C are sectional views showing the method of manufacturing the CF substrate of the liquid crystal display device according to the seventh embodiment. FIGS. 31A to 31C show a sectional shape taken along a line C—C in FIG. 28 respectively.

First, as shown in FIG. 30A and FIG. 31A, the blue color filter 143B of an about 1.5 µm thickness is formed in the blue pixel forming region and the black matrix region on the glass substrate 141 by using the blue pigment-distributed photosensitive resist.

Then, as shown in FIG. 30B and FIG. 31B, the red color filter 143R of an about 1.5 µm thickness is formed in the red pixel forming region on the glass substrate 141 by using the red pigment-distributed photosensitive resist. At this time, the red color filter 143R is formed to be overlapped with the black matrix forming region around the red pixel, the spacer portion forming region, and the blue color filter 143B in the black matrix forming region around the blue pixel. In this case, the red color filter 143R is formed only in a half region of the black matrix forming region between the red pixel and the green pixel on the red pixel side. The red color filter 143R is not formed in the black matrix forming region between the green pixel and the blue pixel.

Then, as shown in FIG. 30 and FIG. 31C, the green color filter 143G of an about 1.5 µm thickness is formed in the green pixel forming region on the glass substrate 141 by using the green pigment-distributed photosensitive resist. At this time, the green color filter 143G is formed to be overlapped with the black matrix forming region around the green pixel and the blue color filters 143B and the red color filters 143R in the spacer portion forming region. In this case, the green color filter 143G is formed only in a half region of the black matrix forming region between the green pixel and the red pixel on the green pixel side.

Then, as shown in FIG. 28 and FIG. 29, the pixel electrode 144 formed of ITO is formed on the color filters 143R, 143G, 143B to have a thickness of about 1000 Å. Then, the projection pattern 145 of an about 10 µm width and an about 1.5 µm height is formed by forming the positive photoresist on the pixel electrodes 144 and then exposing and developing it. Then, the vertical alignment film 146 is formed on the overall upper surface of the glass substrate 141 to have a thickness of about 80 nm. Thus, the CF substrate 140 is completed. If the CF substrate 140 is formed in this manner, a height of the spacer portion 148 is about 3.8 µm.

An advantage of the liquid crystal display device according to the seventh embodiment will be explained hereunder.

If the black matrix is formed as the three-layered structure of the RGB color filters, an inclination angle of a side wall portion of the black matrix becomes large. Hence, an angle of the liquid crystal molecules becomes substantially horizontal relative to the substrate in the neighborhood of the side wall portion of the black matrix. Such alignment abnormality causes the light leakage when no voltage is applied, and causes reduction in the transmittance to bring about considerable reduction of the contrast when the voltage is applied.

Figure 32:
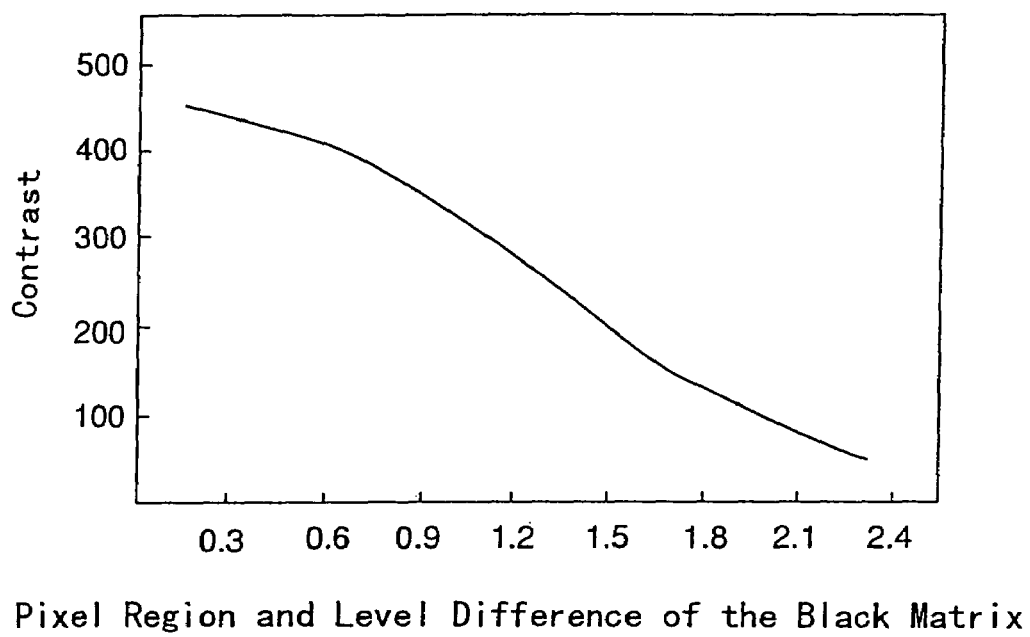
FIG. 32 is a graph showing a relation between difference in level of a pixel region edge portion and a contrast.

FIG. 32 is a graph showing a relation between level difference in the pixel region edge portion and the contrast, wherein an abscissa denotes the level difference between the pixel region and the black matrix and an ordinate denotes the contrast. As can be seen from FIG. 32, if the level difference exceeds 1.5 µm, the contrast become less than 200.

Therefore, in the seventh embodiment, the black matrix 142 is formed of two layers consisting of the blue color filter 143B and one of the red color filter 143R and the green color filter 143G. Accordingly, the level difference between the pixel region and the black matrix can be reduced to about ⅔ of the three-layered structure. As a result, the region in which the liquid crystal molecules are aligned in parallel with the substrate can be reduced about ⅔ in the cell gap direction and thus the light leakage can be reduced.

Figure 33:
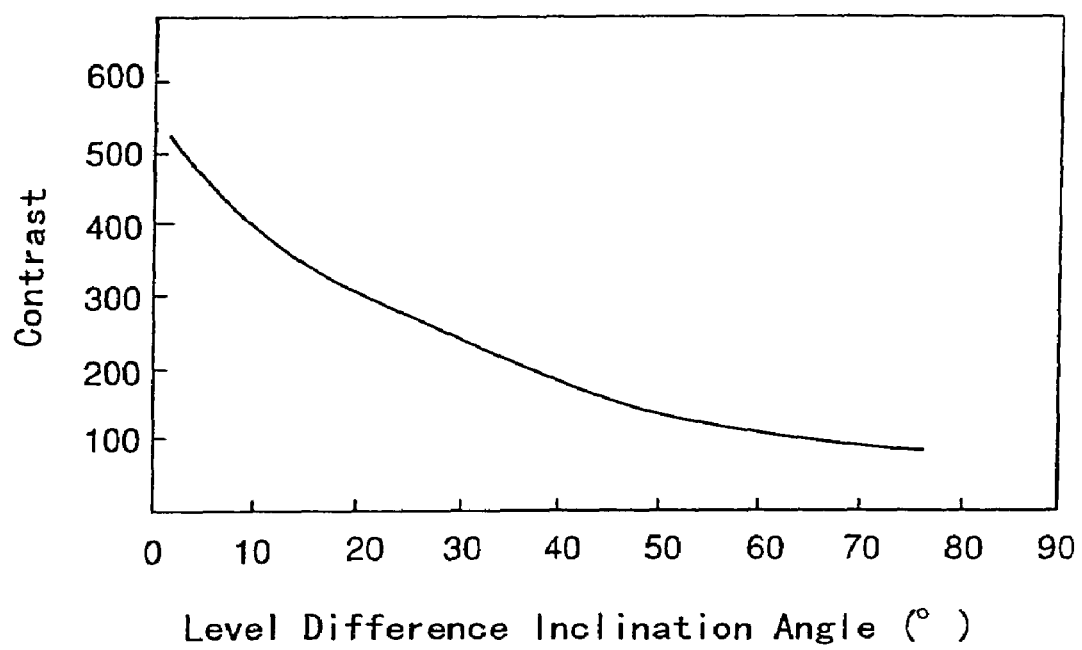
FIG. 33 is a graph showing a relation between an inclination angle of a step of the pixel region edge portion and the contrast.

In addition, the alignment of the liquid crystal molecules comes close to the direction parallel to the surface of the substrate if the inclination angle of the level difference between the pixel region and the black matrix is large, the alignment of the liquid crystal molecules comes close to the direction perpendicular to the surface of the substrate if the inclination angle of the level difference is small. FIG. 33 is a graph showing a relation between the inclination angle of the level difference portion and the contrast, wherein an absiccisa denotes the inclination angle of the level difference portion and an ordinate denotes the contrast. As shown in FIG. 33, if the inclination angle is less than 30 degree, the contrast exceeds 250. As a result, the sufficient contrast can be achieved.

Meanwhile, if it is considered how respective color filters can contribute the brightness, degrees of contribution of RGB to the brightness are R:G:B=3:3:1. Therefore, the light leakage in the blue pixel portion has small influence upon the reduction in the contrast, but the light leakage in the red or green pixel portion has large influence upon the reduction in the contrast.

In the seventh embodiment, an uppermost layer of the black matrix around the red pixel is composed of the red color filter, and an uppermost layer of the black matrix around the green pixel is composed of the green color filter. Therefore, an inclination becomes gentle between the red pixel and the black matrix around the red pixel and between the green pixel and the black matrix around the green pixel, and thus the reduction in the contrast due to the alignment abnormality can be reduced. In this case, the inclination angle is increased around the blue pixel, nevertheless there is no problem of the light leakage in the blue pixel due to the increase of the inclination angle since, as described, the degree of the contribution of the blue pixel to the brightness is small.

When the contrast is checked after the liquid crystal display device is manufactured actually according to the above method, such contrast exceeds 400.

As the method of changing the inclination angle of the level difference between the pixel region and the black matrix, there are the method of changing the exposure condition and the development condition applied when the color filters are formed and the method of changing the resin constituting color filter material. The inclination angle of the level difference between the pixel region and the black matrix can be set to less than 30 degree by using these methods.

According to the seventh embodiment, the light shielding film 142 is constructed by two-layered color filter consisting of the blue color filter 143B and the red color filter 143R around the red pixel, and the light shielding film 142 is constructed by two-layered color filter consisting of the blue color filter 143B and the green color filter 143G around the green pixel. As a result, an inclination angle of the level difference on the red pixel side and an inclination angle of the level difference on the green pixel side can be made small, and thus the light leakage due to the alignment abnormality of the liquid crystal molecules can be reduced.

And since the light shielding film is formed by overlapping the color filters as two layers and the projection pattern is formed thereon so as to keep the cell thickness constant by its top end portions, the liquid crystal display device can be relatively easily manufactured.

In case the light shielding film is formed by overlapping the red color filter and the blue color filter, sometimes the light leakage occurs on the outside portion of the display regions. In order to prevent this light leakage, as set forth in claim 15 and shown in FIG. 21, it is preferable that a redundant light shielding film 152 for cutting off a blue color should be formed on the outside portions of display regions. Therefore, the light leakage of the blue light on the outside portions of display regions can be prevented without fail and thus the display quality can be improved. The present invention can be applied not only the VA (vertically aligned) mode liquid crystal display device not also the liquid crystal display device using the horizontal alignment film.

(Eighth Embodiment)

FIG. 21 is a sectional view showing a liquid crystal display device according to an eighth embodiment of the present invention. In the eighth embodiment, a redundant light shielding film is arranged on the outside of the display region of the liquid crystal display device. As configurations of other portions of the eighth embodiment, for example, the configurations shown in the above first to seventh embodiments can be used.

In the eighth embodiment, a redundant light shielding film 152 is formed on the glass substrate 151 on the outside of the display region of the TFT substrate 150. The redundant light shielding film 152 is formed of a multi-layered metal film consisting of an Al (aluminum) film and a Ti (titanium) film, for example, or a metal film such as a Cr (chromium) film, or a metal oxide film. An edge portion of the vertical alignment film 156 on the TFT substrate 150 side is overlapped with an end portion of the redundant light shielding film 152 on the display region side. In the eighth embodiment, a width of the redundant light shielding film 152 is set to 2.0 mm. However, the width of the redundant light shielding film 152 must be decided according to the alignment accuracy in forming the pattern not to generate a clearance between the vertical alignment film 156 and the redundant light shielding film 152.

A plurality of pixel electrodes (not shown), TFTs (not shown) arranged every pixel electrode, the bus lines (not shown) connected to the TFTs, and the vertical alignment film 156 for covering the pixel electrodes are formed in the display region of the TFT substrate 150.

Like the first to seventh embodiments, the color filters (not shown) arranged in the pixel region, the black matrix 162, the opposing electrode (not shown) for covering the color filters and the black matrix 162 positioned in the display region, and the vertical alignment film 166 are formed on the CF substrate 160. In the eighth embodiment, assume that the black matrix 162 is composed of two layers consisting of the blue color filter and the red color filter. Also, assume that an edge portion of the black matrix 162 (on the outside of the display region) is not covered with the vertical alignment film 166. The redundant light shielding film 152 on the TFT substrate 150 side is arranged to oppose to the black matrix 162 on the outside of the display region.

Figure 34:
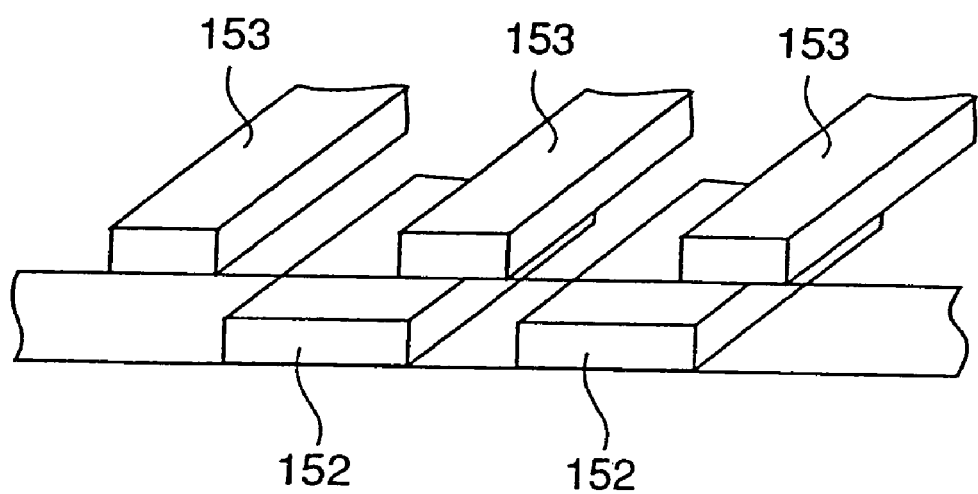
FIG. 34 is a perspective view showing the liquid crystal display device according to the eighth embodiment.

The bus lines (the gate bus lines or the drain bus lines) on the TFT substrate 150 side are extended from the display region to end portions of the substrate 151 to be connected to external circuits. Therefore, in order not to electrically connect the bus lines via the redundant light shielding film 152, the redundant light shielding film 152 must be formed between the bus lines or formed on a different layer from the bus line layer. It is preferable that, if the redundant light shielding film 152 is formed as another layer from the bus line layer, the redundant light shielding film 152 should not be formed immediately on or under the bus line 153, as shown in FIG. 34, to prevent the capacitive coupling between the bus lines.

An advantage of the eighth embodiment will be explained hereunder.

In the event that the black matrix is formed by overlapping the color filters, the thickness of the black matrix is increased by overlapping the color filters as three layers, and as a result disconnection of the opposing electrode on the level difference portion (so-called disconnection due to the level difference) easily occurs. Therefore, it is preferable that, if the black matrix is formed by overlapping the color filters, the layer number of the color filters should be set two. The transmittance is given in Table 1 if two or three color filter layers are overlapped. Where an OD value is a log value of the transmittance.

TABLE 1

| Color Filter | OD value |
|---|---|
| R + G | 1.3 |
| G + B | 1.1 |
| B + R | 2.1 |
| R + G + B | 2.5 |

As can be understood from Table 1, if the black matrix is formed by overlapping two color filters, a combination of the blue color filter and the red color filter can most effectively cut off the light.

However, when the liquid crystal display device in which the black matrix is composed of the blue color filter and the red color filter is manufactured actually, the light leakage of the blue light occurs on the outside portion of the display region. This is due to the following reasons.

Figure 35:
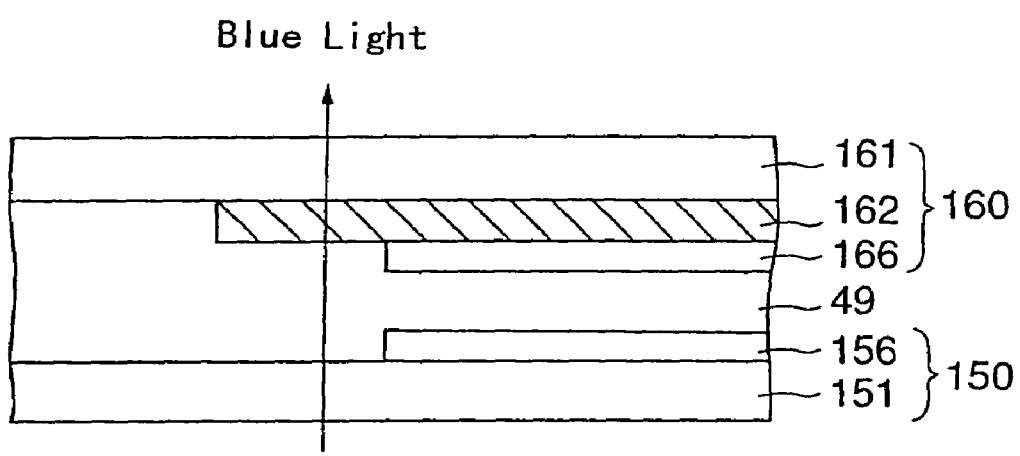
FIG. 35 is a sectional view showing the liquid crystal display device with no redundant light shielding film.

FIG. 35 is a sectional view showing the liquid crystal display device without the redundant light shielding film. In FIG. 35, same symbols are affixed to the same constituent elements as those in FIG. 21 and their detailed explanation will be omitted. Assume that, in this liquid crystal display device, the black matrix is formed by superposing the red color filter on the blue color filter.

As shown in FIG. 27, normally the edge portion of the black matrix 162 on the outside of the display region on the CF substrate 160 side is not covered with the alignment film 166. Since the liquid crystal molecules are aligned at random in this portion, the transmittance can be enhanced when no voltage is applied.

Figure 36:
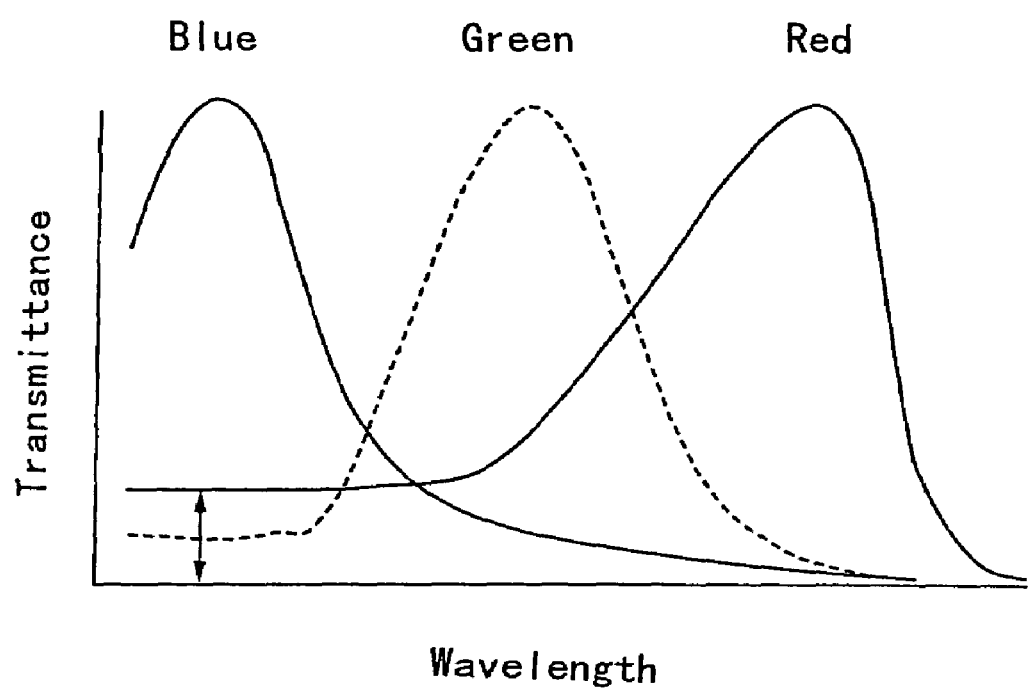
FIG. 36 is a graph showing wavelength spectral characteristics of blue, green, and red color filters.

FIG. 36 is a graph showing wavelength spectral characteristics of blue, green, and red color filters. As shown in FIG. 36, since the transmittance of the red color filter for the light having the blue wavelength region is relatively large, the light in the short wavelength region cannot be sufficiently cut off even if the blue color filter and the red color filter are overlapped with each other. For this reason, the light on the short wavelength side (blue light) is transmitted from the black matrix which is constructed by overlapping the blue color filter and the red color filter, and is then watched as the blue light leakage.

However, in the eighth embodiment, since the redundant light shielding film 152 is arranged on the outside of the display region, the blue light leakage occurred on the outside of the display region can be cut off surely. Also, in the eighth embodiment, since the black matrix 162 on the CF substrate 160 side is composed of the blue color filter and the red color filter, the reflectance is low rather than the redundant light shielding film 152 which is formed of metal on the TFT substrate 150 side, so that such black matrix 162 has an effect as an external light reflection preventing film. As a result, such an advantage can be achieved that the display quality can be improved.

(Ninth Embodiment)

Figure 37:
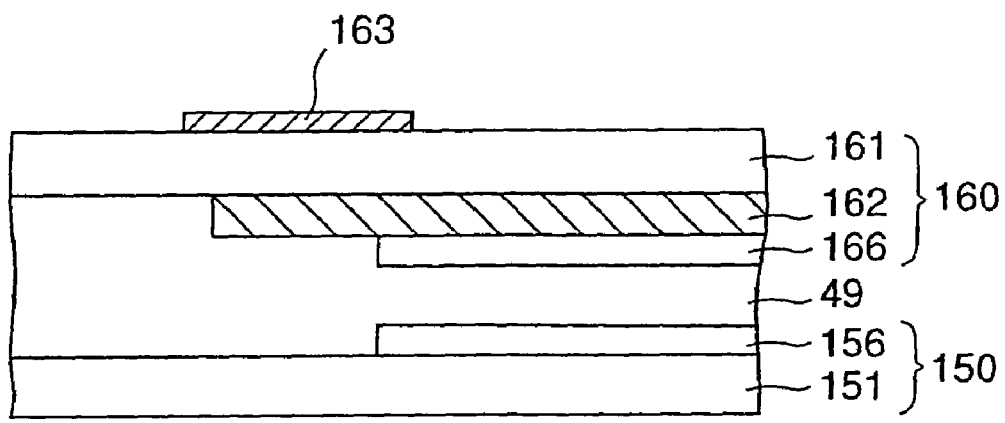
FIG. 37 is a sectional view showing a liquid crystal display device according to a ninth embodiment of the present invention.

FIG. 37 is a sectional view showing a liquid crystal display device according to a ninth embodiment of the present invention. The same symbols are affixed to the same constituent elements in FIG. 37 as those in FIG. 21 and their detailed explanation will be omitted hereunder.

In the ninth embodiment, a color filter 162 formed on a CF substrate 160 is formed by laminating the blue color filter and the red color filter. Also, a redundant light shielding film 163 formed of a UV (Ultraviolet) coat film is formed on an upper surface of the CF substrate 160 (surface on the opposite side to a surface opposing to the TFT substrate 150) on the outside of the display region. The UV coat film is formed by laminating a $TiO_2$ film and an $SiO_2$ film into a multi-layer by the evaporation method, for example, and its cut-off wavelength is less than 500 nm.

In the ninth embodiment, even if the black matrix consisting of the blue color filter and the red color filter transmits the blue light on the outside portion of the display region, such blue light can be cut off by the redundant light shielding film 163. Therefore, the blue light leakage can be prevented without fail.

In the ninth embodiment, the redundant light shielding film 163 formed of the UV coat film is formed on the CF substrate 160 side. However, the redundant light shielding film may be formed on the TFT substrate 150 side, or may be formed on both the CF substrate 160 and the TFT substrate 150.

(Tenth Embodiment)

Figure 38:
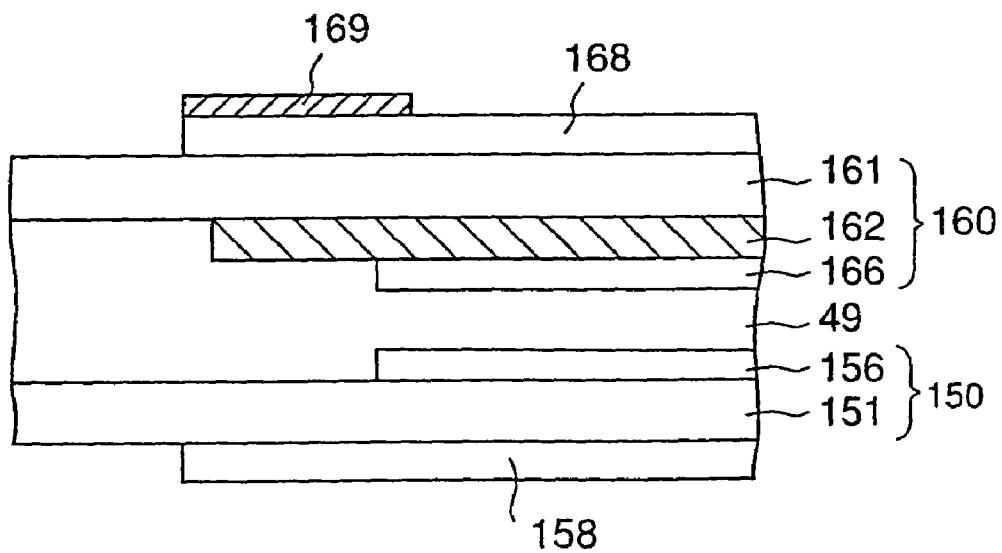
FIG. 38 is a sectional view showing a liquid crystal display device according to a tenth embodiment of the present invention.

FIG. 38 is a sectional view showing a liquid crystal display device according to a tenth embodiment of the present invention. The same symbols are affixed to the same constituent elements in FIG. 38 as those in FIG. 21 and their detailed explanation will be omitted hereunder.

A pair of polarizing plates 158, 168 are arranged to put a liquid crystal panel, which is formed by coupling the CF substrate 160 and the TFT substrate 150 together, between them. These polarizing plates 158, 168 are arranged such that their polarization axes intersect orthogonally with each other. In the tenth embodiment, the UV coat film is formed as a redundant light shielding film 169 on at least one polarizing plate of these polarizing plates 158, 168. In this case, the redundant light shielding film 169 is formed on regions corresponding to portions which are located on the outside portion of the display regions and in which the black matrix 162 is not covered with a vertical alignment film 166.

According to the tenth embodiment, in addition to the similar advantage of the eighth embodiment, there can be achieved such an advantage that, since the redundant light shielding film 169 (UV coat film) is not directly formed on the liquid crystal panel, such UV coat film can be formed easily.

(Eleventh Embodiment)

Figure 39:
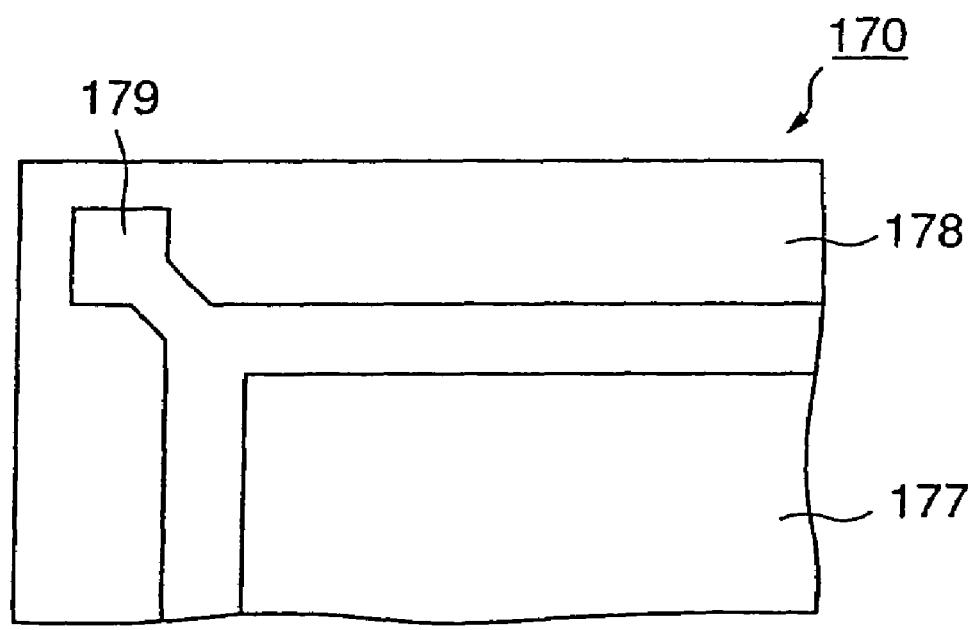
FIG. 39 is a sectional view showing a liquid crystal display device according to an eleventh embodiment of the present invention.
Figure 40A:
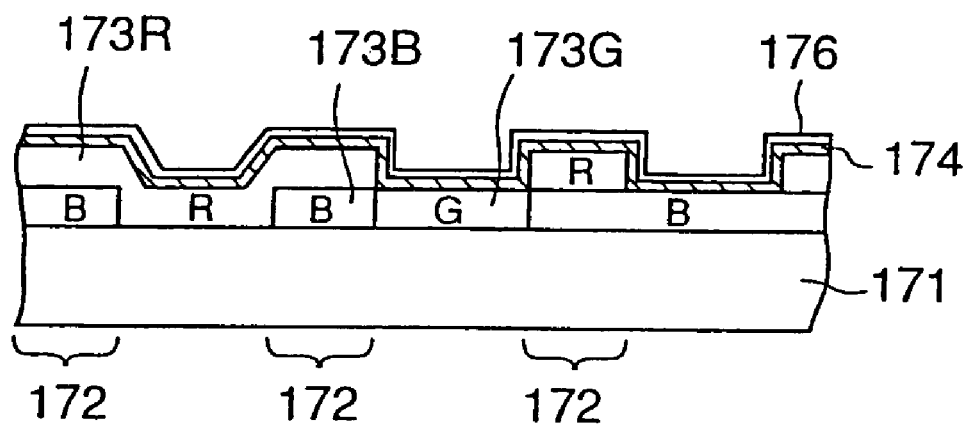
FIG. 40A is a sectional view showing the CF substrate in a display area of the liquid crystal display device according to the eleventh embodiment.
Figure 40B:
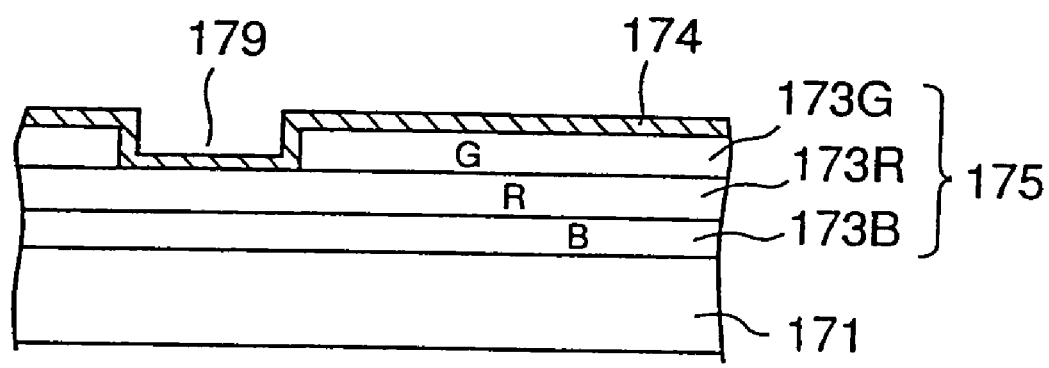
FIG. 40B is a sectional view showing the CF substrate on the outside of the display area.

FIG. 39 is a sectional view showing a CF substrate of a liquid crystal display device according to an eleventh embodiment of the present invention. In the eleventh embodiment, configurations shown in the first to seventh embodiments may be applied as a configuration of the TFT substrate. In FIG. 39, a reference 177 denotes a display region, a reference 178 denotes an outside portion of the display region, and a reference 179 denotes a transfer connecting portion. Also, FIG. 40A is a sectional view showing the CF substrate in the display area 177 of the liquid crystal display device according to the eleventh embodiment. FIG. 40B is a sectional view showing the CF substrate on the outside of the display area.

In the eleventh embodiment, the black matrix in the display area 177 on the CF substrate 170 side is formed by the blue color filter and the red color filter as a double-layered structure. Also, a redundant light shielding film 175 is constructed as a triple-layered structure of the red, green, and blue color filters on the area being located outer than the display region.

Normally, in the liquid crystal display device, the opposing electrode on the CF substrate side and the voltage applying portion on the TFT substrate side are electrically connected via a conductor being called a transfer on the outside portion of the display region. The transfer is arranged in the transfer connecting portion 179.

If all area of the redundant light shielding film on the outside portion of the display region are formed as the triple-layered structure of three color filters, level difference between the display region 177 and the outside portion 178 is increased. As a result, the opposing electrode (ITO film) cannot be formed continuously, and there is a possibility that the disconnection due to the level difference (disconnection) is generated. Therefore, in the eleventh embodiment, as shown in FIG. 40B, generation of connection fault is prevented by laminating the color filters in the transfer connecting portion 179 as the double-layered structure.

Like the above, in the eleventh embodiment, since the redundant light shielding film 175 is constructed as a triple-layered structure of the red, green, and blue color filters on the outside area of the display region, the blue light leakage from the outside portion of the display region can be avoided without fail. In addition, since the color filters which are located on the outside portion of the display region and in the portion being connected electrically to the electrodes on the TFT substrate side via the transfer (transfer connecting portion 179) are laminated as the double-layered structure, the disconnection due to the level difference is difficult to occur in forming the ITO film and thus reduction in yield of the fabrication can be prevented.

As described above, according to the liquid crystal display device of the present invention, since the cell thickness can be kept constant by bringing top end portions of the projection pattern on the second substrate into contact with the first substrate, the spherical or cylindrical spacers which are needed in the prior art can be omitted. Therefore, even if the impact or the vibration is applied, the cell thickness is never varied and thus degradation of the display quality can be prevented. Also, since the interval between the first substrate and the second substrate can be kept constant by the insulating projection pattern formed on the electrodes, short-circuit between the electrodes on the first substrate side and the electrode on the second substrate side can be avoided without fail. In addition, according to the present invention, the alignment direction of the liquid crystal becomes different on both sides of the projection pattern and thus the alignment partition can be achieved. Therefore, such an advantage can be achieved that the visual characteristics can be improved.

Also, according to the method of manufacturing the liquid crystal display device of the present invention, the opposing electrode, the first projection pattern, and the first vertical alignment film are formed on the first substrate, then the pixel electrodes, the second projection pattern, and the second vertical alignment film are formed on the second substrate, then the first substrate and the second substrate are arranged such that surfaces on which the first vertical alignment film and the second vertical alignment film are formed are opposed to each other and top end portions of the first projection pattern are brought into contact with the second vertical alignment film on the second substrate, and then the liquid crystal having the negative dielectric anisotropy is sealed between them. Therefore, the step of scattering the spacers and the step of rubbing the alignment films, etc., which are needed in the prior art, can be omitted and thus the manufacturing steps can be simplified.

Also, according to the liquid crystal display device of the present invention, since the cell thickness adjusting layer is provided, the cell thickness can be adjusted properly not to increase the thickness of the color filters excessively.

Also, according to the liquid crystal display device of the present invention, since the light shielding film is formed of black resin and also one or plural color filters are superposed on the light shielding film, the cell thickness can be adjusted properly not to increase the thickness of the color filters excessively.

Also, according to the liquid crystal display device of the present invention, since the cell thickness can be adjusted by leaving as it is the resist which is used in forming the light shielding film, the cell thickness can be adjusted properly not to increase the thickness of the color filters excessively, and also the manufacturing can be simplified.

Also, according to the liquid crystal display device of the present invention, the light shielding film is composed of the blue color filter and the red color filter around the red pixel, and the light shielding film is composed of the blue color filter and the green color filter around the green pixel. Therefore, since the inclination angle between the red pixel and the light shielding film and the inclination angle between the green pixel and the light shielding film can become gentle, the light leakage due to the alignment abnormality can be reduced.

Also, according to the liquid crystal display device of the present invention, since the redundant light shielding film for cutting off the blue light is provided on the outside portion of the display region, the light leakage of the blue light which is generated on the outside portion of the display region can be prevented without fail if the light shielding film is formed by superposing the red color filter and the blue color filter.

What is claimed is:

1. A liquid crystal display device comprising:
   a first substrate having a plurality of first electrodes formed on one surface side and a first vertical alignment film for covering the plurality of first electrodes;
   a second substrate having red, green and blue color filters arranged opposed to the plurality of first electrodes on the first substrate, a light shielding film formed by overlapping at least two color filters of the red, green and blue color filters to be arranged in regions which correspond to regions between the plurality of first electrodes, a second electrode formed to cover at least the color filters, a cell thickness adjusting layer formed selectively over the light shielding film, a projection pattern formed of insulating material on the second electrode and the cell thickness adjusting layer, and a second vertical alignment film for covering the second electrode and at least the projection pattern on the second electrode, whereby top end portions of the projection pattern come into contact with the first substrate; and
   a liquid crystal sealed between the first substrate and the second substrate and having a negative dielectric anisotropy.

2. A color filter substrate comprising;
   a plate;
   red, green and blue color filters formed on pixel regions of the plate;
   a light shielding film formed by overlapping at least two color filters of said red, green and blue color filters to be arranged in regions between the pixel regions of the plate;
   a transparent electrode for covering at least the color filters;
   a cell thickness adjusting layer formed selectively over the light shielding film;
   projection patterns formed of insulating material on the transparent electrode in the pixel region and on the cell thickness adjusting layer, respectively; and a vertical alignment film for covering the transparent electrode and at least the projection pattern formed in the pixel region.

3. A liquid crystal display device comprising:

a first substrate having a plurality of first electrodes formed on one surface side and a first vertical alignment film for covering the plurality of first electrodes;

a second substrate having red, green and blue color filters arranged opposed to the plurality of first electrodes on the first substrate, a light shielding film formed by overlapping at least two color filters of the red, green and blue color filters to be arranged in regions which correspond to regions between the plurality of first electrodes, a second electrode for covering at least the color filters, a projection pattern formed of insulating material on the second electrode, a cell thickness adjusting layer formed on the projection pattern over the light shielding film, and a second vertical alignment film for covering at least the second electrode, whereby top end portions of the cell thickness adjusting layer come into contact with the first substrate; and a liquid crystal sealed between the first substrate and the second substrate and having a negative dielectric anisotropy.

4. A color filter substrate comprising:

a plate;

red, green and blue color filters formed on pixel regions of the plate;

a light shielding film formed by overlapping at least two color filters of said red, green and blue color filters to be arranged in regions between the pixel regions of the plate;

a transparent electrode for covering at least the color filters;

projection patterns formed of insulating material on the transparent electrode in the pixel region and on the transparent electrode selectively in the regions between the pixel regions, respectively;

a cell thickness adjusting layer formed on the projection pattern formed in the regions between the pixel regions; and a vertical alignment film for covering the transparent electrode and at least the projection pattern formed in the pixel region.

* * * * *

UNITED STATES PATENT AND TRADEMARK OFFICE
CERTIFICATE OF CORRECTION

PATENT NO. : 7,139,061 B2
APPLICATION NO. : 10/702374
DATED : November 21, 2006
INVENTOR(S) : Ikeda et al.

It is certified that error appears in the above-identified patent and that said Letters Patent is hereby corrected as shown below:

On the Title Page, Item (75) Inventors:

The following name should be deleted:

Yoshinori Tanaka, Kanagawa (JP)

Signed and Sealed this

Twenty-second Day of May, 2007

JON W. DUDAS
*Director of the United States Patent and Trademark Office*